US012664571B2

(12) United States Patent
Ryner et al.

(10) Patent No.: US 12,664,571 B2
(45) Date of Patent: **\*Jun. 23, 2026**

(54) VALIDATING IDENTIFICATION OF A USER FOR PURCHASE OF AGE-RESTRICTED ITEMS

(71) Applicant: Walmart Apollo, LLC, Bentonville, AR (US)

(72) Inventors: Douglas Jahe Ryner, Cave Springs, AR (US); David Martin Nelms, Rogers, AR (US); Todd D. Mattingly, Bentonville, AR (US)

(73) Assignee: Walmart Apollo, LLC, Bentonville, AR (US)

( \* ) Notice: Subject to any disclaimer, the term of this patent is extended or adjusted under 35 U.S.C. 154(b) by 113 days.

This patent is subject to a terminal disclaimer.

(21) Appl. No.: 18/599,075

(22) Filed: Mar. 7, 2024

(65) Prior Publication Data

US 2024/0212014 A1 Jun. 27, 2024

Related U.S. Application Data

(63) Continuation of application No. 17/723,332, filed on Apr. 18, 2022, now Pat. No. 11,954,714, which is a
(Continued)

(51) Int. Cl.
*G06Q 30/0601* (2023.01)
*G06Q 20/18* (2012.01)
(Continued)

(52) U.S. Cl.
CPC ......... *G06Q 30/0607* (2013.01); *G06Q 20/18* (2013.01); *G06Q 20/204* (2013.01);
(Continued)

(58) Field of Classification Search
None
See application file for complete search history.

(56) References Cited

U.S. PATENT DOCUMENTS 6,522,772 B1    2/2003  Morrison
7,512,567 B2    3/2009  Bemmel
(Continued)

FOREIGN PATENT DOCUMENTS

CN          205827521 U    12/2016
CN          107798528 A  *  3/2018    ....... G06K 19/06037
(Continued)

OTHER PUBLICATIONS

International Preliminary Report on Patentability in related PCT Patent Application No. PCT/US2018/045543, mailed Feb. 20, 2020. 8 pages.
(Continued)

*Primary Examiner* — Ariel J Yu
(74) *Attorney, Agent, or Firm* — Fitch, Even, Tabin & Flannery, LLP

(57) ABSTRACT

An identification validation system and method may include detecting that a first age-restricted item has been selected for purchase at a first point of sale by a user, determining that an age validation is not enabled, requiring that the user submit an identification instrument to verify an age of the user, after the purchase is complete, prompting the user to enable the age validation feature of the mobile wallet application of the user mobile device, directing a software application loaded on the user mobile device to access at least one biometric data input functionality of the user mobile device to capture the at least one biometric of the user, and comparing biometric features of the user captured by at least one camera.

20 Claims, 11 Drawing Sheets

Related U.S. Application Data continuation of application No. 16/057,001, filed on Aug. 7, 2018, now Pat. No. 11,334,931.

(60) Provisional application No. 62/542,525, filed on Aug. 8, 2017.

(51) Int. Cl.

| | |
|---|---|
| *G06Q 20/20* | (2012.01) |
| *G06Q 20/32* | (2012.01) |
| *G06Q 20/36* | (2012.01) |
| *G06Q 20/40* | (2012.01) |
| *G06V 10/10* | (2022.01) |
| *G06V 40/16* | (2022.01) |
| *G06V 40/70* | (2022.01) |
| *H04L 9/40* | (2022.01) |
| *H04N 7/18* | (2006.01) |

(52) U.S. Cl.
CPC ..... *G06Q 20/3224* (2013.01); *G06Q 20/3278* (2013.01); *G06Q 20/36* (2013.01); *G06Q 20/40145* (2013.01); *G06Q 20/4016* (2013.01); *G06Q 20/405* (2013.01); *G06V 10/17* (2022.01); *G06V 40/172* (2022.01); *H04L 63/0861* (2013.01); *G06V 40/70* (2022.01); *H04N 7/18* (2013.01)

(56) References Cited

U.S. PATENT DOCUMENTS

| | | | |
|---|---|---|---|
| 7,769,638 | B1 | 8/2010 | Mollett |
| 7,931,194 | B2 | 4/2011 | Keys |
| 8,355,992 | B1 | 1/2013 | Haugh |
| 8,473,351 | B1 | 6/2013 | Mollett |
| 8,880,434 | B2 | 11/2014 | Bemmel |
| 9,189,788 | B1 | 11/2015 | Robinson |
| 9,195,815 | B2 | 11/2015 | Choong |
| 9,466,082 | B1 | 10/2016 | Dabiri |
| 9,665,896 | B2 | 5/2017 | Atikoglu |
| 9,881,328 | B2 | 1/2018 | Atikoglu |
| 11,334,931 | B2 | 5/2022 | Ryner |
| 11,734,737 | B2 | 8/2023 | Agarwal |
| 11,954,714 | B2 | 4/2024 | Ryner |
| 2002/0087413 | A1 | 7/2002 | Mahaffy |
| 2003/0018522 | A1 | 1/2003 | Denimarck |
| 2003/0177102 | A1 | 9/2003 | Robinson |
| 2004/0044627 | A1 | 3/2004 | Russell |
| 2004/0133477 | A1 | 7/2004 | Morris |
| 2004/0153421 | A1 | 8/2004 | Robinson |
| 2005/0137987 | A1 | 6/2005 | May |
| 2006/0277148 | A1 | 12/2006 | Thackston |
| 2007/0119923 | A1 | 5/2007 | Garrison |
| 2007/0129056 | A1 | 6/2007 | Cheng |
| 2007/0168290 | A1 | 7/2007 | Robinson |
| 2008/0046366 | A1 | 2/2008 | Bemmel |
| 2008/0073430 | A1 | 3/2008 | Sickenius |
| 2008/0275748 | A1 | 11/2008 | John |
| 2008/0319872 | A1 | 12/2008 | Russell |
| 2009/0063312 | A1 | 3/2009 | Hurst |
| 2009/0064302 | A1 | 3/2009 | Colella |
| 2009/0066478 | A1 | 3/2009 | Colella |
| 2009/0152343 | A1 | 6/2009 | Carter |
| 2009/0321515 | A1 | 12/2009 | Turner |
| 2010/0234987 | A1 | 9/2010 | Benschop |
| 2011/0072039 | A1 | 3/2011 | Tayloe |
| 2011/0145147 | A1 | 6/2011 | Wylie |
| 2012/0028612 | A1 | 2/2012 | Hurst |
| 2012/0030044 | A1 | 2/2012 | Hurst |
| 2013/0007849 | A1 | 1/2013 | Coulter |
| 2013/0048720 | A1 | 2/2013 | Lewis |
| 2013/0073432 | A1 | 3/2013 | Mulholland |
| 2013/0073460 | A1 | 3/2013 | Paquin |
| 2013/0112746 | A1 | 5/2013 | Krell |
| 2013/0179336 | A1 | 7/2013 | Lyons |
| 2013/0201000 | A1 | 8/2013 | Solomon |
| 2013/0204786 | A1 | 8/2013 | Mattes |
| 2013/0326613 | A1 | 12/2013 | Kochanski |
| 2014/0201100 | A1 | 7/2014 | Rellas |
| 2014/0244514 | A1 | 8/2014 | Rodriguez |
| 2014/0282945 | A1 | 9/2014 | Smith |
| 2015/0106296 | A1 | 4/2015 | Robinson |
| 2015/0120559 | A1 | 4/2015 | Fisher |
| 2015/0227995 | A1 | 8/2015 | Takahashi |
| 2016/0086418 | A1 | 3/2016 | Smolen |
| 2016/0210633 | A1 | 7/2016 | Epelman |
| 2016/0247135 | A1 | 8/2016 | Miller |
| 2016/0261411 | A1 | 9/2016 | Yau |
| 2016/0350741 | A1* | 12/2016 | Reen .................... G06Q 20/023 |
| 2017/0109717 | A1 | 4/2017 | Vafeas |
| 2017/0345010 | A1 | 11/2017 | Hagihara |
| 2018/0005244 | A1 | 1/2018 | Govindarajan |
| 2018/0060928 | A1 | 3/2018 | Sadler |
| 2018/0130118 | A1 | 5/2018 | Guran |
| 2018/0181964 | A1 | 6/2018 | Zagarese |
| 2023/0351460 | A1 | 11/2023 | Nidhi |

FOREIGN PATENT DOCUMENTS

| | | |
|---|---|---|
| GB | 2579469 | 6/2020 |
| WO | 2015150917 A2 | 10/2015 |
| WO | 2017065735 A1 | 4/2017 |
| WO | 2017066002 A1 | 4/2017 |
| WO | 2019032538 | 2/2019 |
| WO | 2020060835 | 3/2020 |

OTHER PUBLICATIONS

International Search Report and Written Opinion in PCT/US2018/045543 mailed on Sep. 21, 2018; 9 pages.

Thakkar, Danny; "Shield Your Privacy and Digital Identity with Fingerprints"; https://www.bayometric.com/shield-privacy-digital-identity/; Believed to be publicly available before priority date of Sep. 20, 2018; pp. 1-3.

USPTO; U.S. Appl. No. 16/057,001; Notice of Allowance and Fees Due (PTOL-85) mailed Jan. 18, 2022; (pp. 1-7).

USPTO; U.S. Appl. No. 16/057,001; Office Action dated Mar. 8, 2021; (pp. 1-34).

USPTO; U.S. Appl. No. 16/057,001; Office Action mailed Dec. 2, 2021; (pp. 1-35).

USPTO; U.S. Appl. No. 17/723,332; Non-Final Rejection mailed Jul. 12, 2023; (pp. 1-21).

USPTO; U.S. Appl. No. 17/723,332; Notice of Allowance and Fees Due (PTOL-85) mailed Dec. 18, 2023; (pp. 1-8).

Ward, Kelsey; "Biometric vending machines sell marijuana, lead the way on digital identity?"; https://www.secureidnews.com/news-item/biometric-vending-machines-sell-marijuana-lead-the-way-on-digital-identity/; Jul. 24, 2017; pp. 1-3.

* cited by examiner

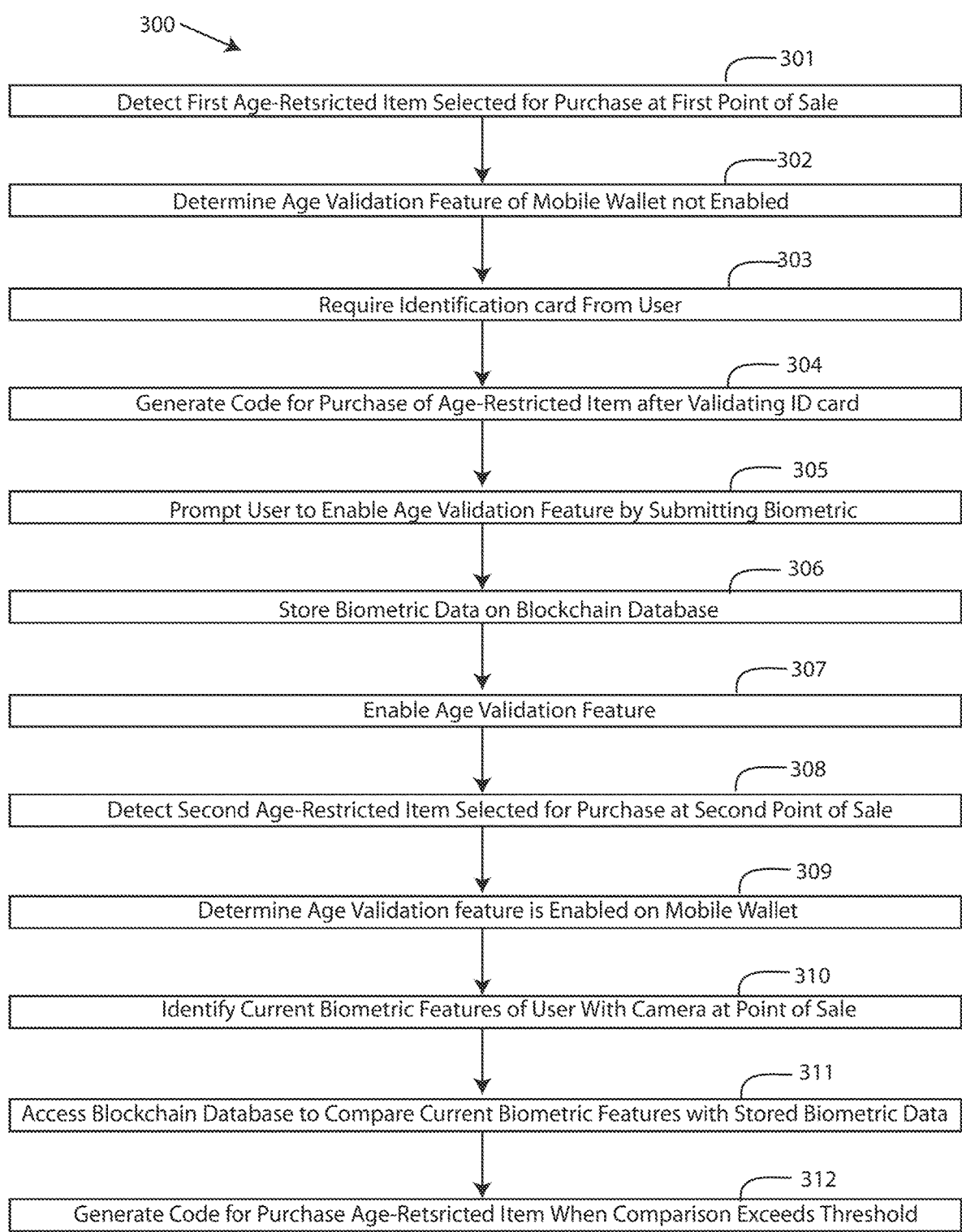

300

301
Detect First Age-Retsricted Item Selected for Purchase at First Point of Sale 302
Determine Age Validation Feature of Mobile Wallet not Enabled 303
Require Identification card From User 304
Generate Code for Purchase of Age-Restricted Item after Validating ID card 305
Prompt User to Enable Age Validation Feature by Submitting Biometric 306
Store Biometric Data on Blockchain Database 307
Enable Age Validation Feature 308
Detect Second Age-Restricted Item Selected for Purchase at Second Point of Sale 309
Determine Age Validation feature is Enabled on Mobile Wallet 310
Identify Current Biometric Features of User With Camera at Point of Sale 311
Access Blockchain Database to Compare Current Biometric Features with Stored Biometric Data 312
Generate Code for Purchase Age-Retsricted Item When Comparison Exceeds Threshold

FIG.8

VALIDATING IDENTIFICATION OF A USER FOR PURCHASE OF AGE-RESTRICTED ITEMS

CROSS-REFERENCE TO RELATED APPLICATIONS

This application is a continuation of U.S. application Ser. No. 17/723,332, filed Apr. 18, 2022, which is a continuation of U.S. application Ser. No. 16/057,001, filed Aug. 7, 2018, now U.S. Pat. No. 11,334,931, which claims the benefit of U.S. Provisional App. No. 62/542,525, filed Aug. 8, 2017, each of which is incorporated herein by reference in its entirety.

TECHNICAL FIELD

The present invention relates to systems and methods for validating user identification, and more specifically the embodiments of an identification validation system for validating identification of a user for purchase of age-restricted items.

BACKGROUND

Retailers that offer a self-checkout option that allows a customer to scan and pay for items using a mobile device do not permit the sale of age-restricted items using the scan and pay system without validation from a store representative. For example, some store items may only be sold to customers over a certain age, according to federal, state, and local laws, or store policy. Validating the customer's age requires intervention from a store representative, which can impede the flow of the checkout experience.

SUMMARY

An embodiment of the present invention relates to a method, and associated computer system and computer program product, for validating age identification at a point of sale. A processor of a computing system detects that a first age restricted item has been selected for purchase at a first point of sale by a user, wherein a payment for the first age-restricted item is configured to be made using a mobile wallet application. It is determined that an age validation feature associated with a user account of the mobile wallet application is not enabled, the age validation feature enabling an automatic age validation to purchase age-restricted items using the mobile wallet application without intervention by a store representative. It is required that the user submit an identification instrument to verify an age of the user to purchase the first age-restricted item, wherein the age is validated by at least one of: a manual inspection of the identification instrument by the store representative, and reading, by the processor, a machine readable element of the identification instrument. A code to be displayed at the point of sale and scanned by the user mobile for completing the purchase of the first age-restricted item is generated, after validating the identification instrument. After the purchase is complete, the user is prompted to enable the age validation feature of the mobile wallet application of the user mobile device within a limited amount of time from receiving the prompt, wherein the prompt instructs the user to input at least one biometric, and upon receiving an approval from the user, a software application loaded on the user mobile device is directed to access at least one biometric data input functionality of the user mobile device to capture the at least one biometric of the user. The at least one biometric is stored on a blockchain database, and the age validation feature associated with the user account of the mobile wallet application loaded on the user mobile device is enabled. A second age restricted item is detected to have been selected for purchase at a second point of sale by the user, wherein a payment for the second age-restricted item is configured to be made using the mobile wallet application. It is determined that the age validation feature associated with the user account of the mobile wallet application is enabled. Biometric features of the user are identified from a video feed captured by at least one camera at the second point of sale to verify an identity of the user. The biometric features of the user captured by the at least one camera in the video feed are compared with the at least one biometric stored on the blockchain database to determine that a comparison between the facial features of the user captured by the at least one camera in the video feed and the at least one biometric stored on the blockchain database exceeds a dynamic threshold for verifying the identity of the user at the second point of sale, allowing the user to proceed with the purchase of the second age-restricted item at the second point of sale without intervention of the store representative. A code to be displayed at the second point of sale and scanned by the user mobile device for completing the purchase of the second age-restricted item is generated.

Another embodiment of the present invention relates to a method, and associated computer system and computer program product, for validating age identification at a point of sale. A processor of a computing system detects an age restricted item has been scanned by a user mobile device, to purchase the age restricted item. A required identification method is determined based on a level of restriction of the age-restricted item. A current identification data is requested from the user mobile device in response to detecting the scanning of the age restricted item, wherein a software application loaded on the user mobile device is directed to access at least one biometric data input functionality of the user mobile device to capture the current identification data of the user, at the point of sale. The current identification data of the user received from the user mobile device is compared with an authenticated identification data of the user to determine that a comparison between the current identification data and the authenticated identification data exceeds a threshold for validating the current identification data, allowing the user to proceed with the purchase of the age-restricted item at the point of sale.

BRIEF DESCRIPTION OF THE DRAWINGS

FIG. 8 depicts a flow chart of a method for validating age identification at a point of sale, in accordance with an embodiment of the present invention.

DETAILED DESCRIPTION

A "scan and pay" system involves a user scanning a unique identifier of a product to add to a cart of a mobile application associated with a retailer. The user may then pay for the products scanned into the application, without waiting in line to checkout at a traditional register or self-checkout lane. A self-checkout point of sale allows a user to scan and pay for items at a checkout location. However, retailers cannot permit a sale of age-restricted items, such as alcohol, spray paint, tobacco, restricted entertainment content, etc., without validating an age of the user. If a user intends to purchase an age-restricted item using the scan and pay mobile application or a mobile wallet at a self-checkout location, the user must seek out or wait for a store representative to validate the age of the user, typically by visual inspection of an identification card, such as a driver's license or state issued ID card. The validation by the store representative can slow down the user's shopping experience, and, in some cases, the user's identification card may not be available for validation (e.g. user left ID in vehicle, forgot the ID card at home, etc.).

Figure 1:
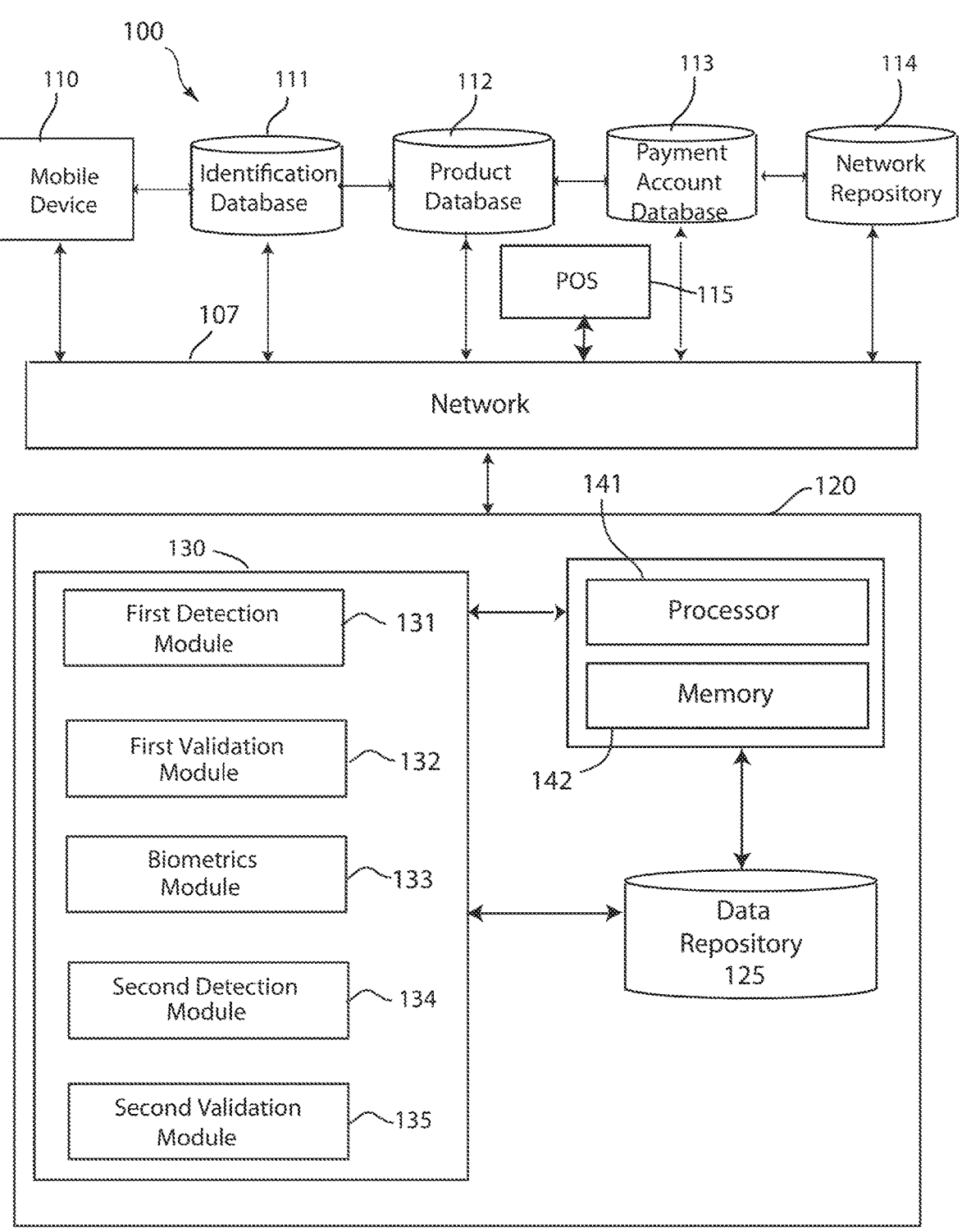
FIG. 1 depicts a block diagram of an identification validation system, in accordance with embodiments of the present invention.

Referring to the drawings, FIG. 1 depicts a block diagram of identification validation system 100, in accordance with embodiments of the present invention. Embodiments of the identification validation system 100 may be a system for validating an identification and age of a user at a point of sale. Embodiments of the identification validation system 100 may be useful for retailers or any entity that may offer a mobile scan and pay checkout option and/or use of mobile wallets at a self-checkout location wherein age-restricted items may be purchased by the user. Embodiments of the identification validation system 100 may be implemented at a point of sale, which may be a user device, such as a mobile phone of the user running a software application associated with the retailer, a self-checkout point of sale, and the like. Embodiments of the identification validation system 100 may also be implemented into "smart carts" that allow a customer to purchase goods by interacting with a user interface coupled to the shopping cart. Embodiments of the identification validation system 100 may be an age validation system, an age authentication system, a mobile point of sale user identification system, and the like. Embodiments of the identification validation system 100 may include a computing system 120. Embodiments of the computing system 120 may be a computer system, a computer, a server, one or more servers, a cloud computing device, a hardware device, a remote server, and the like.

Furthermore, embodiments of identification validation system 100 may include a mobile device 110, an identification database 111, a product database 112, a payments account database 113, and a point of sale (POS) 115 communicatively coupled to a computing system 120 of the identification validation system 100 over a network 107. For instance, information/data may be transmitted to and received from the mobile device 110, the identification database 111, the product database 112, the payments account database 113, and the POS 115 over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing information of the user, store items, and inventory management, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user transaction data, user identification validation data, purchased item information, and the like, to generate both historical and predictive reports regarding a particular user or a user's transaction, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Figure 2:
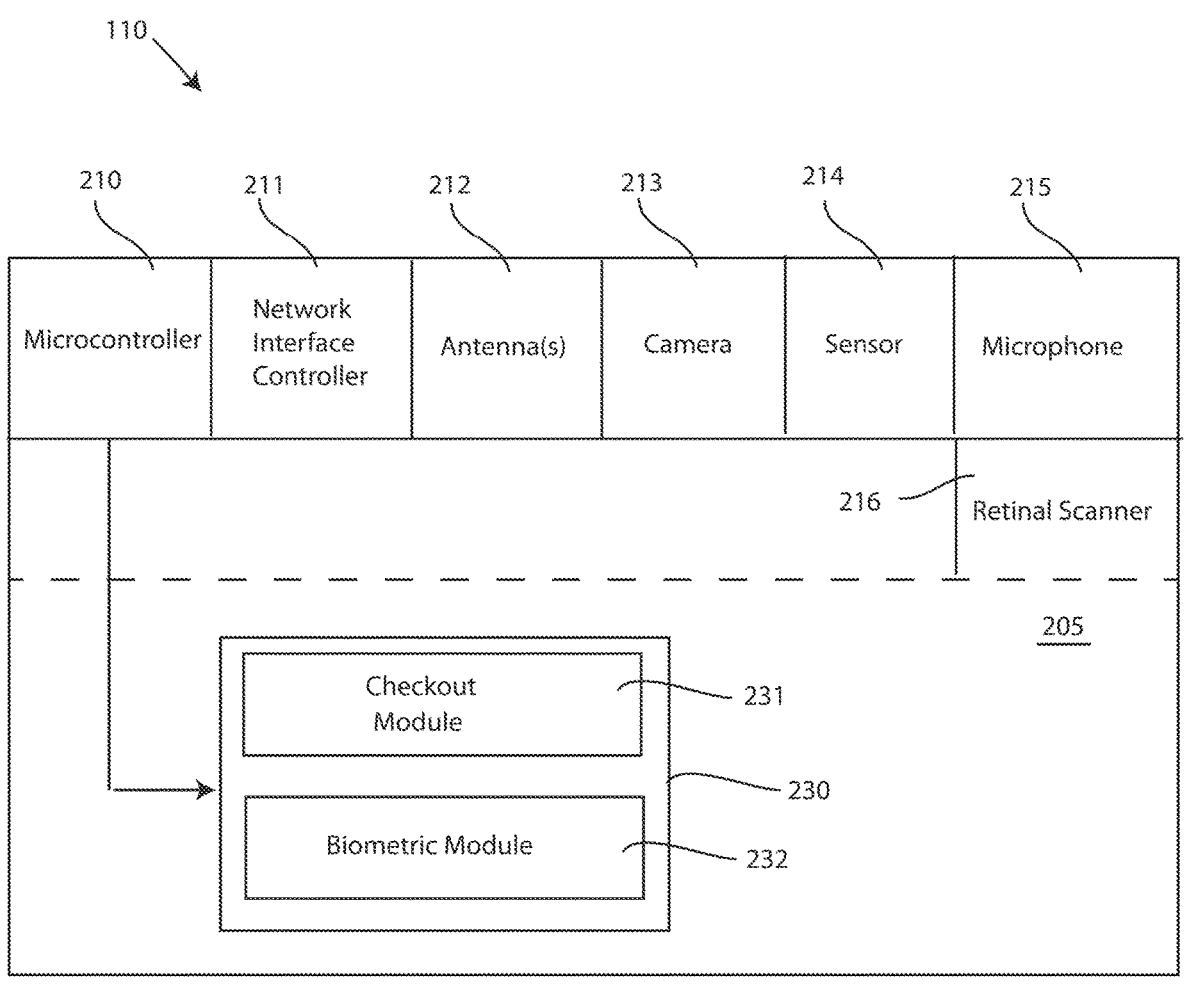
FIG. 2 depicts a block diagram of a mobile device, in accordance with embodiments of the present invention.

Embodiments of the mobile device 110 of the identification validation system 100 may be a user device, a cell phone, a smartphone, a user mobile device, a mobile computer, a tablet computer, a PDA, a smartwatch, a dedicated mobile device, or other internet accessible device or hardware. FIG. 2 depicts a block diagram of a mobile device 110, in accordance with embodiments of the present invention. Embodiments of the mobile device 110 may include hardware and software components. For instance, embodiments of the mobile device may include hardware components such as a microcontroller 210, a network interface controller 211, one or more antennas 212, a camera 213, a sensor 214, a microphone 215, and a retina scanner 216. Embodiments of the mobile device 110 may also include a power source, such as one or more batteries. Embodiments of the mobile device 110 may include additional components as known to those skilled in the art. Software components of the mobile device 110 may be located in a memory system 205 of the mobile device 110. Embodiments of the mobile device 110 may include a microcontroller 210 for implementing the tasks associated with the mobile device 110. In an exemplary embodiment, the mobile device 110 may communicate with computing system 120 to transmit information/data needed to validate an age and/or identification of a user. For example, embodiments of the mobile device 110 may include an antenna 212 for transmitting at least one user biometric data to the computing system 120. Embodiments of the mobile device 110 may include at least one biometric data input functionality, which can be a hardware of the user mobile device, coupled to a processor of the mobile device 110 operating a software application 230. For instance, embodiments of the mobile device 110 may be equipped with a camera 213 to photograph, scan, analyze, or otherwise capture, and process a unique identifier associated with a piece of merchandise, as well as a face or other biometric of the user. Similarly, embodiments of the mobile device 110 may include a sensor 214, a microphone 215, and a retina scanner 216 to capture or otherwise obtain a biometric of the user, such as a fingerprint, retinal scan, voice signature, video, and the like. Further, embodiments of the portable device 115 may include a network interface controller (NIC) 211 for connecting the mobile device 110 to the network 107.

Additionally, embodiments of the mobile device 110 may include software components, such as a software application 230 running to enable a checkout option. Embodiments of the mobile software application 230 may include a checkout module 231 and a biometric data module 232. A "module" may refer to a hardware based module, software based module or a module that may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory system 205 of the mobile device 110. A module (whether hardware, software, or a combination thereof) may be designed to implement or execute one or more particular functions or routines.

Embodiments of the checkout module 231 may include one or more components of hardware and/or software program code for connecting to the POS 115 to enable a self-checkout using a mobile wallet application loaded on the user mobile device 110. Moreover, embodiments of the biometric data module 232 may include one or more components of hardware and/or software program code for transmitting, sending, or otherwise providing biometric information/data retrieved, obtained, captured, or otherwise received via input by the user, as described in greater detail infra. The mobile device 110 may also include a product scanning module, which is one or more components of hardware and/or software program code for scanning store merchandise for adding to a cart and purchasing the store merchandise.

In one embodiment, the mobile device 110 may be a point of sale. The mobile device 110 may be used to process or facilitate a purchase transaction. Embodiments of the mobile device 110 may be used to process or facilitate payments from a customer, track orders, connect to other systems on a network, including a transactions records database, and send or receive communications to the computing system 120. In an exemplary embodiment, when a customer intends to checkout at a retailer, the customer may interact with the mobile device 110.

Referring back to FIG. 1, embodiments of the identification database 111 of the identification validation system 100 may be one or more databases, storage devices, repositories, and the like, that may store or otherwise contain information and/or data regarding personal identifying information such as an age of the user, biometric data, such as a photograph of the user, fingerprint or retinal scan of the user, and the like. The identification database 111 may be accessed over network 107, and may be managed and/or controlled by a third party, or by a retailer associated with the mobile application 230 on the mobile device 110. In an exemplary embodiment, the identification database 111 may store or otherwise contain authenticated identification data of the user, which may be accessed for comparing a current identification data with the stored authenticated identification data. The identification database 111 may be populated with authenticated user identification data obtained based on a previous authentication process. For instance, prior to using the scan and pay application for purchasing age-restricted items, the user may interact with a store representative to present evidence of the user's identification and age. The store representative may visually inspect the evidence, such as a state issued driver's license or state issued identification card, birth certificate, and the like, to authenticate the user's age and identity. After identification and age of the user has been verified, the store representative may request the user to input one or more biometric identifiers for uploading and storage to the identification database 111. In one example, the store representative may take one or more photographs of the user for storing in the identification database 111. In another embodiment, the user may input the user's fingerprint into a fingerprint sensor for storing in the identification database 111. In yet another embodiment, the user may input a retinal scan into a retinal scanner for storing in the identification database 111. The biometric data of the verified user collected under supervision of a store representative may be accomplished using sensors, cameras, computers, etc. connected to computing system 120, and operated by the retailer. Alternatively, the user may provide one or more biometric inputs using the user's mobile device, in response to a prompt from the computing system 120, which may be in response to a request for the computing system 120 to begin a biometric identification process from a store computer, for example. The biometric data stored on the authentication database 111 may be encrypted and available for comparing with biometric data provided at a time of a sale of an age-restricted item. Alternatively, the authentication database 111 may receive authenticated biometric information from a third party database, such as a law enforcement database, federal agency database, and the like. Further, the authentication database 111 may be populated with encrypted biometric data and identification information of a user based on an automated process. Specifically, a software application may prompt the user to input identifying information (e.g. name, date of birth, etc.) and take a selfie, which is stored. The user is also prompted to send a photograph of a government-issued identification (e.g. passport, state driver's license, etc.), which is verified. The verified identification of the user using the software application can be stored on the identification database 111.

In another alternative embodiment, the identification database 111 is a block chain database. Validated age information can be stored on the blockchain when the POS 115 reads a valid authentication instrument, such as a state issued driver's license. For example, the age-identification information of the user is stored on the blockchain in response to the user validating the user's age at the POS 115. The blockchain database may be a distributed peer-to-peer network, including a plurality of nodes. The blockchain may represent a computing environment for operating a decentralized framework that can maintain a distributed data structure. In other words, the blockchain database may be a secure distributed transaction ledger or a blockchain that may support document management. Each node may maintain an individual public ledger (i.e. maintained publicly) according to set procedures that employ cryptographic methods and a proof-of-work concept. In view of the public nature of the ledger and the proof-of-work concept, the nodes collectively create a decentralized, trusted network. Further, embodiments of the blockchain database may be accessible by the computing system for verifying an identity, including age, of the user. Further, the identification database 111 as the blockchain includes a plurality of blocks. Each block may include data regarding recent transactions and/or contents relating to biometric data of the user, linking data that links one block to a previous block in the blockchain, proof-of-work data that ensures that the state of the blockchain is valid, and is endorsed/verified by a majority of the record keeping system. The confirmed transactions of the blockchain are done using cryptography to ensure that the integrity and the chronological order of the blockchain are enforced and can be independently verified by each node of the blockchain. New transactions may be added to the blockchain using a distributed consensus system that confirms pending transactions using a mining process, which means that each transaction can easily be verified for accuracy, but very difficult or impossible to modify. Moreover, embodiments of a block of the blockchain may include a header and a content. Embodiments of the header may include a block ID, a previous block ID, and a nonce. The nonce may represent a proof-of-work. The header may be used to link block to other blocks of the blockchain. Likewise, a next block may include a header and contents. The next block includes a hash of the previous block's header, thereby linking the blocks to the blockchain.

Accordingly, embodiments of the identification database 111 include authenticated biometric data for the user, obtained through one manner or another, which can be relied upon for future comparisons with biometric data submitted from the mobile device 110 during a time of a sale of an age-restricted item.

Embodiments of the product database 112 of the identification validation system 100 may be one or more databases, storage devices, repositories, and the like, that may store or otherwise contain information and/or data regarding product information, such as price, SKU number, etc. The product database 112 may be accessed over network 107, and may be managed and/or controlled by a third party, or by a retailer associated with the mobile application 230 on the mobile device 110. In an exemplary embodiment, the product database 112 may store or otherwise contain information/data of products that are scanned by the mobile 110, for facilitating the scan and pay or mobile checkout process.

Embodiments of the payment account database 113 of the identification system 100 may include one or more databases, storage devices, repositories, and the like, that may store or otherwise contain information and/or data regarding one or more payment instruments associated with the user and the user's mobile application on the mobile device 110. The payment accounts database 113 may also be accessed over network 107, and may be affiliated with, managed, and/or controlled by one or more financial institutions, issuers, authorizers, and the like. Embodiments of the computing system 120 may query the payment accounts database 113 to identify a user of the mobile device 110 that transmitted the communication to the computer system 120, based on one or more payment instruments associated with the user. Payment instruments may be a bank account, a credit card account, a debit card, a checking account, an electronic gift card, and the like. Embodiments of computing system 120 may retrieve or otherwise receive payment instrument information stored on the mobile device 110 or stored on a remote server servicing the mobile device 110, for facilitating a purchase of one or more items, including age-restricted items (i.e. a mobile wallet).

Figure 3:
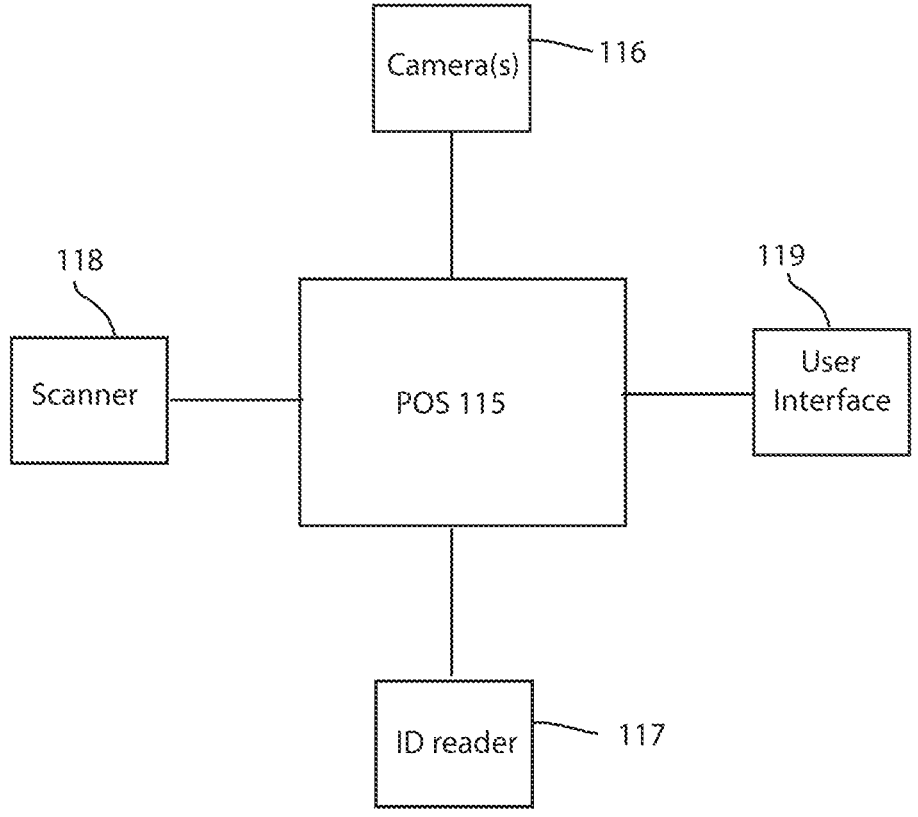
FIG. 3 depicts a schematic diagram of a point of sale, in accordance with embodiments of the present invention.

Referring still to FIG. 1, the age validation system 100 includes a POS 115. Embodiments of the POS 115 may be a computing system with a graphical user interface, allowing the user to interact with the graphical user interface to checkout. In an exemplary embodiment, the POS 115 is a self-checkout computer. FIG. 3 depicts a schematic diagram of a POS 115, in accordance with embodiments of the present invention. The POS 115 is coupled to one or more cameras 116, an ID reader 117, and a scanner 118, and further includes a user interface 119. The camera 116 is configured to capture video or a series of digital images proximate the POS 115. For instance, the camera 116 constantly captures a video feed of an area around the POS 115. The video feed encompasses a user as the user approaches and is present within a certain distance from the POS 115. The video feed captured by the camera 116 is sent to the computing system 120 by the POS 115. The ID reader 117 is configured to read machine readable data from an identification instrument or ID card of the user (e.g. Driver's license), such reading data from a RFID chip of the identification instrument or a magnetic strip of the identification instrument. The scanner 118 is configured to scan items for checkout. The user interface 119 is configured to be used by the user to input one or more selections, such as a confirmation that the user wishes to checkout using a mobile wallet application loaded on the user mobile device 110.

Further, embodiments of the computing system 120 may be equipped with a memory device 142 which may store various transaction details, and a processor 141 for implementing the tasks associated with the identification validation system 100. In some embodiments, an identification validation application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the identification validation application 130. Embodiments of the identification validation application 130 may be an interface, an application, a program, a module, or a combination of modules. In an exemplary embodiment, the identification validation application 130 may be a software application running on one or more back end servers, servicing multiple computing devices.

The identification validation application 130 of the computing system 120 includes a first detection module 131, a first validation module 132, a biometrics module 133, a second detection module 134, and a second validation module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the first detection module 131 includes one or more components of hardware and/or software program code for detecting that a first age restricted item has been selected for purchase at a first point of sale by a user. A payment for the first age-restricted item is configured to be made using a mobile wallet application loaded on the user mobile device 110. The detection by the first detection module 131 may be in response to an age-restricted item being scanned by the user at the POS 115. For instance, embodiments of the first detection module 131 may determine that the item scanned by the user is age-restricted if a unique identifier of the age-restricted item, such as a UPC code, bar codes, and the like, indicates that the item cannot be purchased by an individual under a certain age. Other methods may be used to detect and/or determine that a scanned item includes an age-restriction. For instance, the first detection module 131 may access a product information database 112 over the network 107 to determine that the item being scanned includes a restriction, such as an age restriction.

The first detection module 131 is also configured to determine that an age validation feature associated with a user account of a mobile wallet application is not enabled. The age validation feature enables an automatic age validation to purchase age-restricted items using the mobile wallet application without intervention by a store representative. The first detection module 131 determines whether the user intends on checking out at the first point of sale, such as POS 115, using the mobile wallet application. The user can interface with the POS 115 to connect the user mobile device 110 to the computing system 120 to identify the user. In one implementation, the mobile device 110 wirelessly communicates with a chip reading device at the POS to link the user mobile device 110 to the POS 115, and then to the computing system 120. The link can be established using near field communication (NFC), RFID technology, and other short range contactless communication technologies. In another implementation, the mobile wallet application loaded on the user mobile device 110 connects to the computing system 120 when a user launches the mobile wallet application, over network 107. In another implementation, the mobile wallet application loaded on the user mobile device 110 connects to the computing system 120 over network 107 when a user selects an option in the mobile wallet application to start a checkout process.

The first detection module 131 checks the mobile wallet application to determine whether the age validation feature is enabled or otherwise set up or previously established. If the age validation feature is not enabled, this means that the user has not provided one or more biometrics to be stored on the identification database 111, and the computing system 120 cannot automatically validate the age of the user attempting to purchase an age-restricted item.

The computing system 120 also includes a first validation module 132. The first validation module 132 includes one or more components of hardware and/or software program code for requiring that the user submit an identification instrument (e.g. ID) to verify an age of the user to purchase the first age-restricted item. The identification instrument can be a state issued driver's license, a government issued identification card, a passport, and the like. The identification instrument includes a machine readable element that allows the ID reader 117 to read data from the identification instrument. In one embodiment, the machine readable element of the identification instrument is a magnetic strip located on the identification instrument. In another embodiment, the machine readable element is an embedded RFID chip that wirelessly communicates data to the ID reader 117. Other methods can be used to read machine readable code from an identification instrument.

The first validation module 132 may instruct, prompt, or otherwise direct the user to utilize the ID reader 117 so that the first validation module 132 can verify that the user is of appropriate age to purchase the age-restricted item. In one embodiment, the user is instructed to swipe the user's driver's license through the ID reader 117, wherein the ID reader reads the data from a magnetic strip on the driver's license. In another embodiment, the first validation module 132 activates the ID reader to send a radio wave signal to the RFID embedded chip to read the data from the identification instrument. The first validation module 132 confirms, from the data read from the identification instrument, or a subsequent database storing additional identification information, that the user is at least the required age to purchase the age-restricted item.

Alternatively, a store representative manually inspects the user's identification instrument and inputs a validation code into the POS 115, which the first validation module 132 verifies. Based on the successful input of a store code by the store representative, the first validation module 132 confirms the identity of the user.

In response to a successful validation of the user and the identification instrument, the first validation module 132 generates a code (e.g. QR code, unique identifier, token, etc.) to be displayed at the point of sale and scanned by the user mobile for completing the purchase of the first age-restricted item. The transaction is then automatically completed by the cooperation of the mobile wallet application and the computing system 120.

Figure 4A:
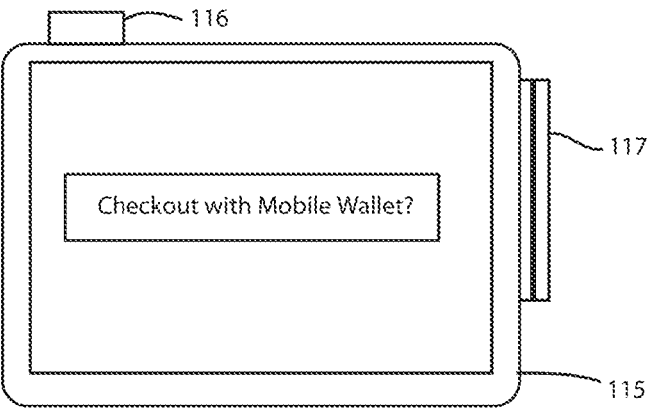
FIG. 4A depicts a user interface of a first point of sale at a beginning of checkout process, in accordance with an embodiment of the present invention.
Figure 4B:
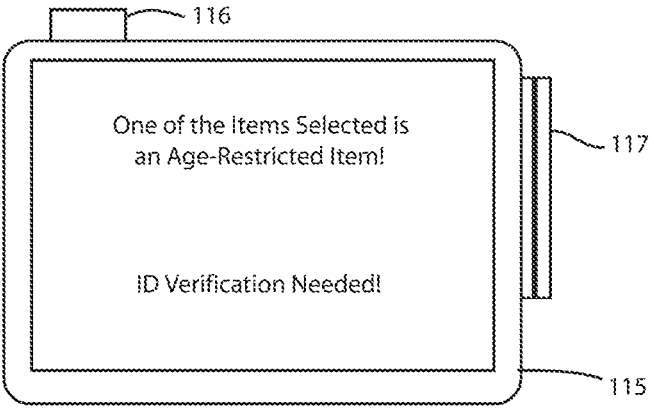
FIG. 4B depicts a user interface of the first point of sale when an age-restricted item has been selected for purchase, in accordance with an embodiment of the present invention.
Figure 4C:
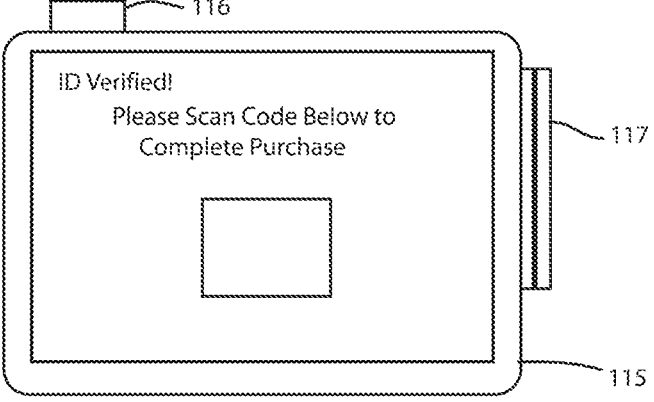
FIG. 4C depicts a user interface of the first point of sale after the user identity has been identified, in accordance with an embodiment of the present invention.

FIG. 4A depicts a user interface of a first point of sale at a beginning of checkout process, in accordance with an embodiment of the present invention. The POS 115 displays a selectable icon with text that states "Checkout with Mobile Wallet?" The user selects the selectable icon to confirm that the user would like to continue with the checkout process using the mobile wallet application. FIG. 4B depicts a user interface of the first point of sale when an age-restricted item has been selected for purchase, in accordance with an embodiment of the present invention. The POS 115 displays a message "One of the Items Selected is an Age-Restricted Item!" It is determined that the user has not enabled the age validation feature of the mobile wallet application. Thus, the user is notified that ID verification is needed. The user interacts with the ID reader (e.g. swiping ID) or the ID reader sends out a signal to interact with a RFID chip of the user's ID, to confirm and validate that the user identity if verified. FIG. 4C depicts a user interface of the first point of sale after the user identity has been identified, in accordance with an embodiment of the present invention. The POS 115 displays a message "ID Verified!" Further, the code to be scanned by the user mobile device 110 is generated and displayed on the user interface of the POS 115 for completing the transaction of the age-restricted item.

Referring back to FIG. 1, the computing system includes a biometrics module 133. The biometrics module 133 includes one or more components of hardware and/or software program code for prompting the user to enable the age validation feature of the mobile wallet application of the user mobile device 110 within a limited amount of time from receiving the prompt. The prompt, which could be a push notification, text message, etc., instructs or asks the user to input at least one biometric. Upon receiving an approval from the user, the biometric module 132 directs a software application loaded on the user mobile device to access at least one biometric data input functionality of the user mobile device to capture the at least one biometric of the user. The at least one biometric data input functionality may be a hardware of the mobile device 110, including a camera 213, a fingerprint sensor 214, a microphone 215, and/or a retina scanner 216, the at least one biometric data input functionality being coupled to a processor or controller 210 of the mobile device 110 operating the software application 230. For instance, the biometrics module 133 of the computing system 120 instructs the mobile device 110 to initiate a biometric data capture functionality, to capture a current biometric of the user. In a first embodiment, the biometrics module 133 instructs the mobile device 110 to open a camera application that controls a functionality of the camera 213 of the mobile device, so that a user can take a photograph of the user's face. In a second embodiment, the biometrics module 133 instructs the mobile device 110 to open an application that controls a functionality of a fingerprint sensor 214 of the mobile device 110, so that a user can input a fingerprint into the sensor 214. In a third embodiment, the biometrics module 133 instructs the mobile device 110 to open a camera application that controls a functionality of the camera 213 and optionally a microphone 215 of the mobile device 110, so that a user can take a video of the user. In a fourth embodiment, the biometrics module 133 instructs the mobile device 110 to open a microphone application that controls a functionality of the microphone 215 of the mobile device 110, so that a user can record a voice signature. In a fifth embodiment, the biometrics module 133 instructs the mobile device 110 to open a retinal scanner application that controls a functionality of a retina scanner of the mobile device 110, so that a user can scan the user's retina. In other embodiments, the biometrics module 133 instructs the mobile device 110 to capture more than one biometric data, such as a combination of a photograph, a video, a voice signature, a fingerprint, and a retinal scan, based on a type of age-restricted item.

Because the mobile wallet application associated with the user's mobile device 110 was recently used in a validated purchase, the user can use the mobile device 110 to submit at least one biometric to enable the age validation feature. To limit inaccuracy or fraud, the time to capture a biometric is limited to a predetermined amount of time from the completion of the checkout or a predetermined amount of time from the validation by the first validation module 132. The prompt to enter the user's biometric thus expires after the predetermined time. Further, automatically prompting the user to enable the age validation feature increases a use of the age validation by the users utilizing the mobile wallet application. The automatic enablement of the age validation feature of the mobile wallet application may involve opening a notification automatically sent to the user's mobile device 110 and then taking a photograph of the user, by the user, within a certain time before the expiration of the prompt.

The biometrics module 133 stores the at least one biometric received from the mobile device to the identification database 111. In one implementation, the at least one biometric is stored on the blockchain database. The blockchain database is accessible by a plurality of points of sale (e.g. POS 115) at multiple locations. Furthermore, the biometrics module 133 enables the age validation feature associated with the user account of the mobile wallet application loaded on the user mobile device, without the user needing to navigate through settings on the mobile wallet application or confirming the enablement of the age-validation feature.

Figure 5A:
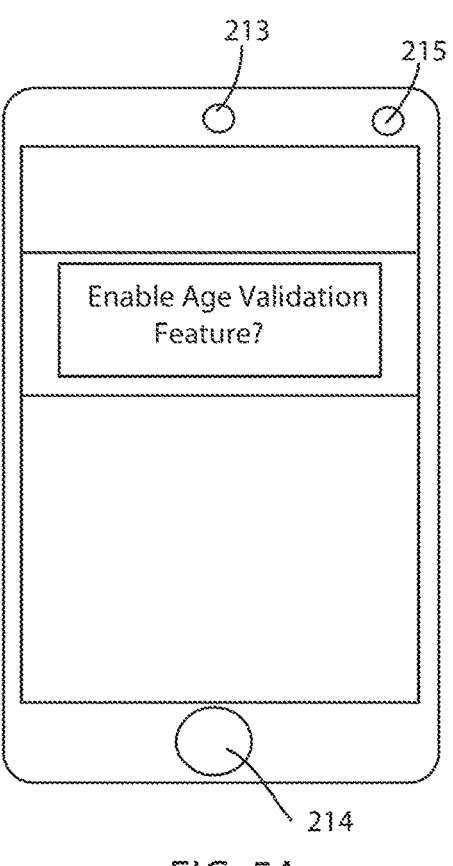
FIG. 5A depicts a user interface of a user mobile device receiving a prompt to enable age validation feature, in accordance with an embodiment of the present invention.
Figure 5B:
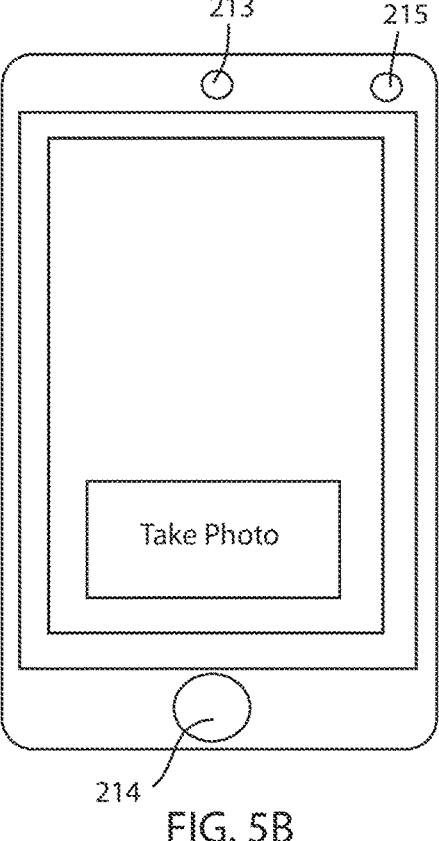
FIG. 5B depicts a user interface of the user mobile device for taking a photograph or video, in accordance with an embodiment of the present invention.
Figure 5C:
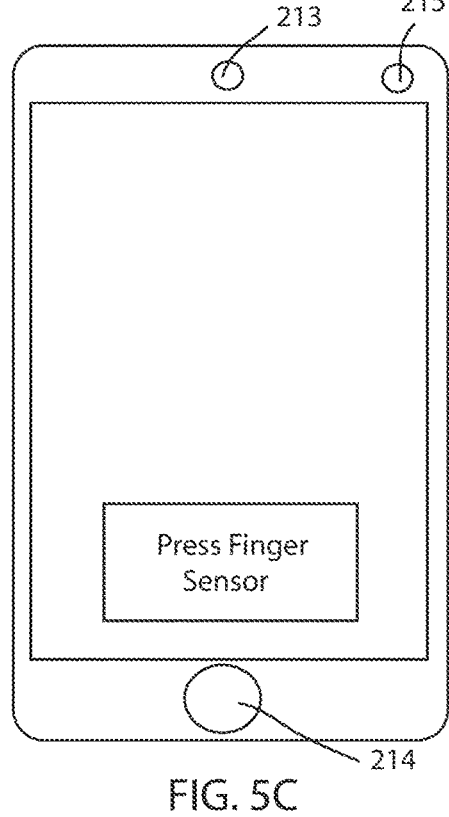
FIG. 5C depicts a user interface of the user mobile device for inputting a fingerprint, in accordance with an embodiment of the present invention.

FIG. 5A depicts a user interface of a user mobile device receiving a prompt to enable age validation feature, in accordance with an embodiment of the present invention. The user interface displays a notification which can be opened to display a selectable icon with text that asks, "Enable Age Validation Feature?" The user selects this selectable icon to proceed with the automatic enabling of the age validation feature. FIG. 5B depicts a user interface of the user mobile device for taking a photograph or video, in accordance with an embodiment of the present invention. For example, the camera application has been launched on the user mobile application, and the user is instructed to take a photograph for capturing a biometric of the user. The biometric data of the photograph or video is transmitted to the computing system after the photograph or video is captured by the user mobile device. FIG. 5C depicts a user interface of the user mobile device for inputting a fingerprint, in accordance with an embodiment of the present invention. The biometric data of the fingerprint is transmitted to the computing system 120.

Referring back to FIG. 1, the computing system also includes a second detection module 134. The second detection module 134 includes one or more components of hardware and/or software program code for detecting that a second age restricted item has been selected for purchase at a second point of sale by the user. A payment for the second age-restricted item is configured to be made using the mobile wallet application. The detection by the second detection module 134 may be in response to an age-restricted item being scanned by the user at the POS 115, which can be the same or a different POS at a same store or a different store. For instance, embodiments of the second detection module 134 may determine that the item scanned by the user is age-restricted if a unique identifier of the age-restricted item, such as a UPC code, bar codes, and the like, indicates that the item cannot be purchased by an individual under a certain age. Other methods may be used to detect and/or determine that a scanned item includes an age-restriction. For instance, the second detection module 134 may access a product information database 112 over the network 107 to determine that the item being scanned includes a restriction, such as an age restriction.

The second detection module 134 is also configured to determine that an age validation feature associated with a user account of a mobile wallet application is enabled. The age validation feature enables an automatic age validation to purchase age-restricted items using the mobile wallet application without intervention by a store representative. The second detection module 134 determines whether the user intends on checking out at the second point of sale, such as POS 115, using the mobile wallet application. The user can interface with the POS 115 to connect the user mobile device 110 to the computing system 120 to identify the user, as described above. The second detection module 134 checks the mobile wallet application to determine whether the age validation feature is enabled or otherwise set up or previously established. If the age validation feature is enabled, this means that the user has provided one or more biometrics to be stored on the identification database 111, and the computing system 120 can automatically validate the age of the user attempting to purchase an age-restricted item. Thus, the second detection module 134 determines that that the age validation feature associated with the user account of the mobile wallet application is enabled.

The computing system 120 also includes a second validation module 135. The second validation module 135 includes one or more components of hardware and/or software program code for identifying biometric features of the user (e.g. facial features of the user) from a video feed captured by at least one camera 116 at the second point of sale to verify an identity of the user. For instance, one or more cameras 116 built into the POS 115 or positioned on or around the POS 115 captures a video feed surrounding the POS 115. The cameras 116 capture the user approaching the POS 115 and interacting with the POS 115. The user is recognized by analyzing the video feed from the one or more cameras 116 at the POS 115 so that the second validation module 135 does not initiate a sequence to require the user to submit a physical identification instrument to purchase age-restricted items. Because the user's mobile wallet application is set to enable the age validation feature, the user's biometric(s) are stored on identification database 111, and the second validation module 135 analyzes the video feed by applying biometric recognition techniques to extract one or more biometric features (e.g. facial features, retinal features, voice of the user, etc.).

Furthermore, the second validation module 135 compares the biometric features (e.g. facial features) of the user captured by the at least one camera 116 in the video feed with the at least one biometric stored on the blockchain database to determine that a comparison between the biometric features of the user captured by the at least one camera 116 in the video feed and the at least one biometric stored on the blockchain database exceeds a dynamic threshold for verifying the identity of the user at the second point of sale, thereby allowing the user to proceed with the purchase of the second age-restricted item at the second point of sale without intervention of the store representative.

The second validation module 135 retrieves an authenticated identification data associated with the user from the identification database 111. For example, the second validation module 135 queries or otherwise accesses one or more identification databases 111 to retrieve, obtain, locate, etc. previously authenticated identification data, such as authenticated biometric data of the user sent in response to the automatic prompt to enable the age validation feature. The second validation module 135 then compares the biometric features of the user captured by the camera 116 with the at least one biometric stored on the blockchain database. The comparison by the second validation module 135 determines whether the currently identified biometric features match (e.g. percentage match) the at least one biometric stored on the blockchain database. In one embodiment, the second validation module 135 utilizes a facial recognition software to compare a face of the user from the camera feed with a face associated the facial biometric stored on the blockchain database. In another embodiment, the second validation module 135 utilizes a voice recognition software to compare a voice of the user in the current video feed with an associated with the voice biometric stored on the blockchain database. Other software may be used to perform the comparison, such as a software for verifying/comparing fingerprint images, retinal scans, and the like.

If the biometric features from the video or image matches the biometric data stored on the blockchain, then the second validation module 135 sends a validation signal to the POS 115 to proceed with the checkout sequence and generate code to be displayed at the second point of sale and scanned by the user mobile device for completing the purchase of the age-restricted item.

Furthermore, to determine whether the biometric features "match" the stored biometric, the second validation module 135 requires that the comparison exceeds a threshold. The threshold may be an integer, relating to a match percentage (e.g. 0-100). In an exemplary embodiment, the threshold is a dynamic threshold. For example, the dynamic threshold varies based on a type of age restricted item and/or a jurisdiction of a retailer selling the age-restricted item. For example, for a first type of age-restricted item, the threshold may be 98, which means that the current identification data must be at least a 98% match with the authenticated identification data. For a second type of age-restricted item, the threshold may be 91, which means that the current identification data must be at least a 91% match with the authenticated identification data. Various thresholds may be set by the second validation module 135, and may also vary by biometric input. For instance, a threshold of 88 may be used for photographs, whereas a threshold of 97 may be used for fingerprints, for the same item, and vice versa. If the second validation module 135 determines that the comparison exceeds a threshold (e.g. pre-determined threshold), the second validation module 135 validates the age or identification of the user.

In addition to, or as part of, the determining whether the comparison exceeds a threshold, the second validation module 135 further calculates a confidence metric of the comparison. The confidence metric measures a confidence level that the percentage match between the biometric features in the video feed and the stored biometric is accurate. The second validation module 135 may analyze a quality of the biometric data received from the video feed to determine that the quality is sufficient for finding a close match, even when the second validation module 135 calculates a close match percentage. For instance, the second validation module 135 may analyze an image quality of an image transmitted to the computing system 120 to ensure that a match may not be determined based on a low-quality image. If the image is very blurry, or too dark, the confidence metric may be low. If the image quality is very clear and bright, the confidence level may be high. Thus, in addition to calculating a percentage match of a comparison between the biometric features captured by the camera 116 and the stored biometric(s), the second validation module 135 also calculates a confidence metric or confidence level. The confidence metric represents a confidence level that a percentage match between the biometric features and the stored biometrics exceeds the dynamic threshold. A required confidence level of the percentage match varies based on the level of restriction of the age-restricted item. If the second validation module 135 determines that the comparison exceeds the threshold based on a percentage match, but the confidence level is low, then the second validation module 135 may reject the validation based on the video, and request another biometric data from the user to validate. If the second validation module 135 determines that the comparison exceeds the threshold based on a percentage match, and the confidence level is high, then the second validation module 135 validates the age/identity of the user, and allows the user to continue with the purchase of the age-restricted item. The impact of the confidence level may also vary by the type or level of restriction of age-restricted item. For example, if the confidence level in the percentage match is low, but the level of restriction is also low, then the second validation module 135 may still approve the validation. If the confidence level in the percentage match is low, and the level of restriction is high, the second validation module 135 may reject the validation.

Figure 6A:
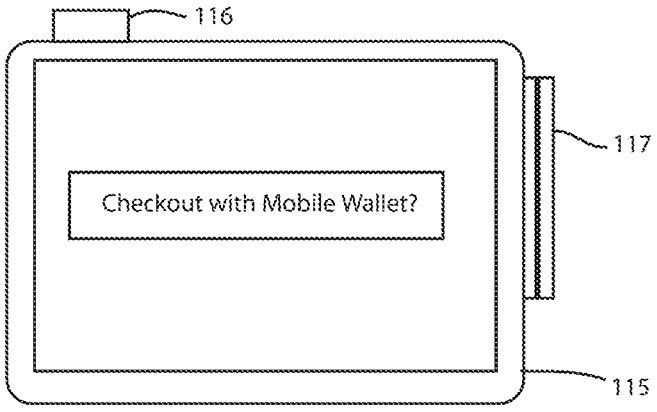
FIG. 6A depicts a user interface of a second point of sale at a beginning of checkout process, in accordance with an embodiment of the present invention.
Figure 6B:
FIG. 6B depicts a user interface of the second point of sale when an age-restricted item has been selected for purchase, in accordance with an embodiment of the present invention.
Figure 6C:
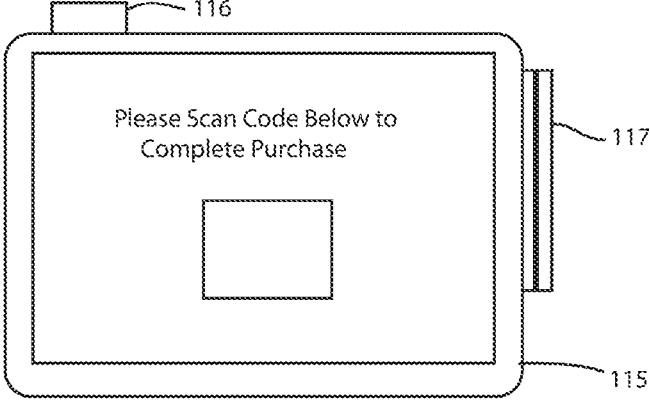
FIG. 6C depicts a user interface of the second point of sale after the user identity has been identified, in accordance with an embodiment of the present invention.

FIG. 6A depicts a user interface of a second point of sale at a beginning of checkout process, in accordance with an embodiment of the present invention. The POS 115 displays a selectable icon with text that states "Checkout with Mobile Wallet?" The user selects the selectable icon to confirm that the user would like to continue with the checkout process using the mobile wallet application. FIG. 6B depicts a user interface of the second point of sale when an age-restricted item has been selected for purchase, in accordance with an embodiment of the present invention. The POS 115 displays a message "One of the Items Selected is an Age-Restricted Item!" It is determined that the user has enabled the age validation feature of the mobile wallet application, and the video of the user at the second point of sale confirms the identity of the user associated with the user account of the mobile wallet application with the enabled age validation feature. Thus, a separate ID verification is not needed. FIG. 6C depicts a user interface of the second point of sale after the user identity has been identified without requiring an interaction from the user, in accordance with an embodiment of the present invention. The POS 115 displays a code to be scanned by the user mobile device 110 on the user interface of the POS 115 for completing the transaction of the age-restricted item.

Accordingly, embodiments of the identification validation system 100 may be implemented to validate an age and/or identity of a user at a point of sale, without requiring intervention by a store representative. Further, using the system 100, age or identification may be validated even if the user does not have identifying items with them at the point of sale (e.g. left ID in the car).

In one additional embodiment, the second validation module 135 may require that the user submit an additional biometric in real-time, which is in addition to the automatic validation based on the video feed from the cameras 116.

Depending on the level of restriction of the age-restricted item, or if fraud detection is suspected, the second validation module 135 determines a required current identification method based on the level of restriction of the second age-restricted item. The required current identification method requires a combination of at least two different biometric data input functionalities. For instance, the second validation module 135 may determine which additional biometric data input functionality to use for capturing the current identification data and/or how many different biometric inputs are needed based on user selected preferences or acceptable biometric input functionalities based on a type of the age-restricted item the user intends to purchase.

Furthermore, the age validation system 100 permits additional layers of fraud detection. The computing system 120 can analyze a purchase history of age-restricted items purchased with the mobile wallet application having the age validation feature enabled with a recent purchase activity to determine that fraud has occurred, and in response to determining that fraud has occurred, disabling the age validation feature. For instance, if a user purchase history indicates that the user purchases one bottle of wine twice a year around the same time of year, and a recent purchase activity shows that the user is purchasing two bottles of alcohol each weekend, the computing system 120 may flag the recent purchase activity as potential fraudulent activity. The computing system 120 can then disable the age validation feature so that the user that owns the account has to submit new biometric data. Further, the computing system 120 can detect that the user account is logged in at two points of sale at the same time or within a predetermined time period at two different geographical locations, and in response to the detecting, disable the age validation feature. In the event the user account is used to purchase an age-restricted item in Florida, and then within 25 minutes the same user account is used to purchase an age-restricted item in California, the computing system 120 concludes that fraudulent activity has occurred, and can disable the age validation feature of the mobile wallet application.

In an example of the age validation system 100, a user interacts with a vending machine in State A that sells age-restricted items by selecting an age-restricted item to purchase from the vending machine. The vending machine does not recognize the user and requires the user to insert the user's driver's license to prove that the user is old enough to purchase the age-restricted item from the vending machine. The vending machine reads the machine readable data from the user's driver's license and validates the user's age, and allows the user to purchase the age-restricted item using the mobile wallet application loaded on the user's smartphone. After the vending machine supplies the age-restricted item, the user receives a notification from the vending machine, asking if the user would like to enable an age validation feature so that in the future, the user does not need to insert the user's driver's license. The user opens the notification and the camera application on the user's smartphone is opened, and the user takes a photograph of the user before the window of time to take the photograph expires. The user's smartphone automatically transmits the photograph to the vending machine, and the vending machine stores the photograph on the blockchain, and enables the age validation feature on the user's mobile wallet application. A week later, while on a business trip, the user approaches another vending machine in State B to purchase an age-restricted item. The vending machine recognizes the user from a camera on the vending machine, and thus does not require the user to insert the user's driver's license to complete the purchase of the age-restricted item from the vending machine.

Figures 7A, 7B, 7C:
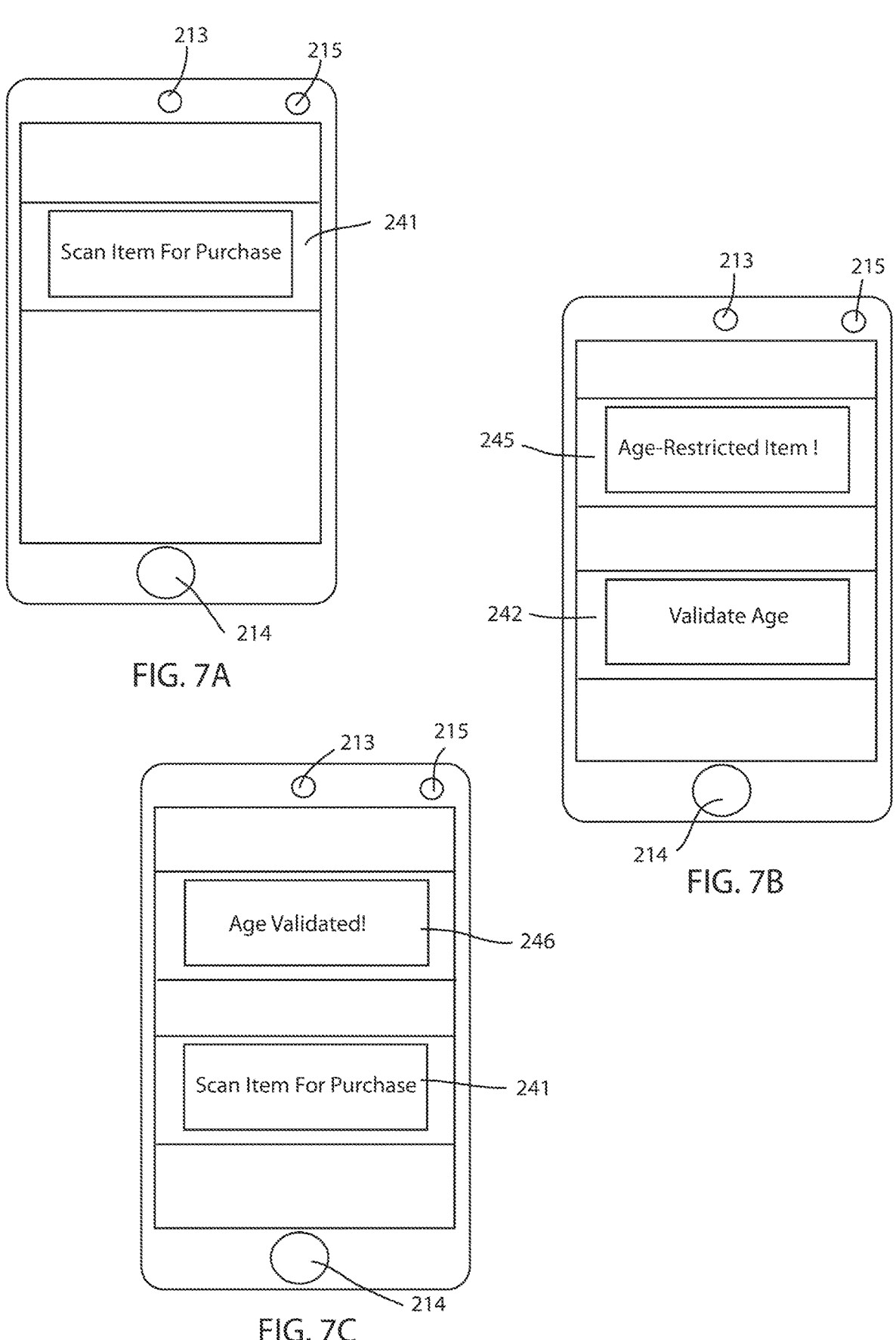
FIG. 7A depicts an embodiment of a mobile device running an application, prior to scanning an age-restricted item, in accordance with an alternative embodiment of the present invention.
FIG. 7B depicts an embodiment of a mobile device running an application, when an age-restricted item has been scanned, in accordance with the alternative embodiment of the present invention.
FIG. 7C depicts an embodiment of a mobile device running an application, when age has been validated, in accordance with the alternative embodiment of the present invention.

An alternative embodiment of the age validation system 100 will be described. FIG. 7A depicts an embodiment of a mobile device 110 running application 230, prior to scanning an age-restricted item, in accordance with an alternative embodiment of the present invention. The mobile device 110 may include a selectable option to scan an item for purchase 241. The user may select option 241 to initiate a camera of the mobile device 110 to scan or otherwise capture an identifier, such as computer readable information, of the item the user intends to purchase. The camera of the mobile device 110 may be located on a back face of the mobile device 110 to scan an item, or the user may use camera 213 on a front face of the mobile device 110. The computing system 120 requests a current identification data from the mobile device 110, in response to detecting the scanning of the age restricted item. FIG. 7B depicts an embodiment of a mobile device 110 running application 230, when an age-restricted item has been scanned, in accordance with the alternative embodiment of the present invention. In response to detecting that an age-restricted item has been scanned by the user mobile device 110, the computing system 120 may send a notification to the mobile device 110. For example, computing system 120 sends a notification 245 to alert the user that the user has scanned an age-restricted item (e.g. "Age-Restricted Item!"). Additionally, in response to detecting that an age-restricted item has been scanned, the computing system 120 prompts the user, for example, via a selectable option 242, to validate the user's age (e.g. "Validate Age"). The prompt 242 may be a request sent from the computing system 120 for the user to validate the age of the user; the user may decide whether to dismiss the prompt 242 or to select prompt 242 to validate the user's age. Alternatively, the computing system 120 automatically (e.g. without asking the user whether the user wishes to validate) directs the software application 230 loaded on the mobile device 110 to access at least one biometric data input functionality of the user mobile device 110 to capture a current identification data of the user, at the point of sale.

Accordingly, if the user intends to validate the user's age to move forward with purchasing the age-restricted item, or as an automatic response to detecting an age-restricted item, the computing system 120 directs the software application 230 loaded on the mobile device 110 to access at least one biometric data input functionality of the user mobile device to capture a current identification data of the user, at the point of sale. The at least one biometric data input functionality may be a hardware of the mobile device 110, including a camera 213, a fingerprint sensor 214, a microphone 215, and/or a retina scanner 216, the at least one biometric data input functionality being coupled to a processor or controller 210 of the mobile device 110 operating the software application 230. For instance, the computing system 120 may instruct the mobile device 110 to initiate a biometric data capture functionality, to capture a current biometric of the user. In a first embodiment, the identification module 132 may instruct the mobile device 110 to open a camera application that controls a functionality of the camera 213 of the mobile device, so that a user can take a photograph of the user's face. In a second embodiment, the identification module 132 may instruct the mobile device 110 to open an application that controls a functionality of a fingerprint sensor 214 of the mobile device 110, so that a user can input a fingerprint into the sensor 214. In a third embodiment, the identification module 132 may instruct the mobile device 110 to open a camera application that controls a functionality of the camera 213 and microphone 215 of the mobile device 110, so that a user can take a video of the user. In a fourth embodiment, the identification module 132 may instruct the mobile device 110 to open a microphone application that controls a functionality of the microphone 215 of the mobile device 110, so that a user can record a voice signature. In a fifth embodiment, the identification module 132 may instruct the mobile device 110 to open a retinal scanner application that controls a functionality of a retina scanner of the mobile device 110, so that a user can scan the user's retina. In other embodiments, the identification module 132 may instruct the mobile device 110 to capture more than one biometric data, such as a combination of a photograph, a video, a voice signature, a fingerprint, and a retinal scan, based on a type of age-restricted item.

In further embodiments, the computing system 120 determines which biometric data input functionality to use for capturing the current identification data and/or how many different biometric inputs are needed based on user selected preferences or acceptable biometric input functionalities based on a type of the age-restricted item the user intends to purchase. The computing system 120 determines the user preferences by either accessing a local storage device of the mobile device 110 or a database servicing the mobile device 110. The computing system 120 may determine the acceptable biometric input functionality and/or how many different biometric inputs are needed by accessing the products database 113 or another database or server associated with the computing system 120. In a first example, if the user seeks to purchase an R-rated movie, and the user preference is a to take a photograph, the computing system 120 determines that a photograph is an acceptable biometric input functionality for an R-rated movie, and directs the mobile device 110 to launch the camera application for capturing the current identification data. In a second example, if the user seeks to purchase a lottery ticket, and the user preference is to take a photograph, the computing system 120 determines that a photograph is not an acceptable biometric input functionality, and that a fingerprint is required. The computing system 120 then directs the mobile device 110 to launch the fingerprint reader application for capturing the current identification data, despite the user's preference. In a third example, if the user seeks to purchase alcohol, the computing system 120 determines that, based on the age-restricted item being alcohol, a combination of biometric input functionalities is required to validate the user's age. The computing system 120 may bypass a user preference (e.g. to take a photograph) and require the user to provide two different biometrics to validate the user's age. Thus, the computing system 120 directs the mobile device 110 to launch the fingerprint reader application for capturing the current identification data, despite the user's preference as a first level of validation, and subsequently directs the mobile device 110 to activate the retina scanner to scan the user's retina for capturing the current identification data.

Accordingly, the computing system 120 determines which biometric data input functionality to use for capturing the current identification data and/or how many different biometric inputs are needed based on a type of the age-restricted item the user intends to purchase. Items that are more restricted require a higher degree of certainty that a user is age-appropriate. Each age-restricted item is classified at a level of restriction. The level of restriction of the age-restricted item may depend on a age limit of the age-restricted item (e.g. 21 vs. 18), an impact on a health of a user (e.g. tobacco), and a severity of a punishment for breaking a law governing a sale of the age-restricted to an unauthorized user (e.g. sale of alcohol to a minor). The age-restricted items can be arranged in various tiers or levels of restriction, wherein each tier or level of restriction requires a different and/or more stringent validation procedure. For instance, alcohol and tobacco can be grouped in a highest tier or level of restriction, requiring a retina scan and a fingerprint from the user at the point of sale, for comparing with the authenticated retina scan and fingerprint stored on the authentication database 111. Spray paint and lottery tickets can be grouped a tier or level of restriction lower than the highest tier or level of restriction, requiring a single biometric input, but requiring a short video to be uploaded for facial recognition software to detect a face of the user for comparing with facial detection data stored on the authentication database 111. An R-rated movie for purchase can be placed into a lowest tier or level of restriction, requiring a single biometric input that is determined by a user set preference. Various combinations of required biometric inputs can be used in this tiered approach to capturing a current identification data.

The captured biometric data (i.e. current identification data) may then be transmitted by the mobile device 110 and received by the computing system 120. The current identification data may be encrypted by the mobile device 110 and decrypted by the computing system 120. The computing system 120 may perform an encryption method to further protect the biometric data being received by the computing system 120.

Referring still to FIGS. 7A-7B, the computing system 120 validates the current identification data and the age of the user. For instance, the computing system 120 compares the current identification data of the user received from the mobile device 110 with an authenticated identification data of the user to determine that a comparison between the current identification data and the authenticated identification data exceeds a threshold for validating the current identification data, allowing the user to proceed with the purchase of the age-restricted item at the point of sale.

In response to receiving the current identification data from the mobile device 110, the computing system 120 retrieves an authenticated identification data associated with the user, from the identification database 111. For example, the computing system 120 queries or otherwise accesses one or more identification databases 111 to retrieve, obtain, locate, etc. previously authenticated identification data, such as authenticated biometric data of the user. The authenticated identification data has previously been authenticated using one or more authentication techniques. The computing system 120 then compares the received current identification data with the authenticated identification. The comparison by the computing system 120 determines whether the current identification data provided by the mobile device 110 matches (e.g. percentage match) the authenticated identification data. In one embodiment, the computing system 120 utilizes a facial recognition software to compare a face of the user in the current photograph and/or video with a face of the authenticated. In another embodiment, the computing system 120 utilizes a voice recognition software to compare a voice of the user in the current recording with a voice of the authenticated user. Other software may be used to perform the comparison, such as a software for verifying/comparing fingerprint images, retinal scans, and the like.

If the current identification data matches the authenticated data, then the computing system 120 may notify the user and allow a scan and pay application 230 to continue. FIG. 7C depicts an embodiment of a mobile device running application tion 230, when age has been validated, in accordance with the alternative embodiment of the present invention. The computing system 120 sends the mobile device 110 a notification 246 that the user's age/identification has been validated (e.g. "Age validated!"). The user can then proceed to scan another item, with selectable option 241. Alternatively, once the current identification has been validated by the computing system 120, the application 230 may automatically allow the user to proceed with payment or continue scanning items, without a notification.

Furthermore, to determine whether the current identification data "matches" the authenticated identification data, the computing system 120 requires that the comparison between current identification data and the authenticated identification data exceeds a threshold. The threshold may be an integer, relating to a match percentage (e.g. 0-100). The threshold may be a dynamic threshold. For example, the dynamic threshold varies based on a type of age restricted item and/or a jurisdiction of a retailer selling the age-restricted item. For example, for a first type of age-restricted item, the threshold may be 98, which means that the current identification data must be at least a 98% match with the authenticated identification data. For a second type of age-restricted item, the threshold may be 91, which means that the current identification data must be at least a 91% match with the authenticated identification data. Various thresholds may be set by the computing system 120, and may also vary by biometric input. For instance, a threshold of 88 may be used for photographs, whereas a threshold of 97 may be used for fingerprints, for the same item, and vice versa. If the computing system 120 determines that the comparison between the current identification data and the authenticated identification data exceeds a threshold (e.g. pre-determined threshold), the computing system 120 may validate the current identification data, and ultimately the age or identification of the user.

In addition to, or as part of, the determining whether the comparison exceeds a threshold, the computing system 120 may further calculate a confidence metric of the comparison between the current identification data and the authenticated identification data. The confidence metric may measure a confidence level that the percentage match between the current identification data and the authenticated data is accurate. Embodiments of the computing system 120 may analyze a quality of the biometric data received from the mobile device to determine that the quality is sufficient for finding a close match, even when the computing system 120 calculates a close match percentage. For instance, the computing system 120 may analyze an image quality of an image transmitted to the computing system 120 to ensure that a match may not be determined based on a low-quality image. If the image is very blurry, or too dark, the confidence metric may be low. If the image quality is very clear and bright, the confidence level may be high. Thus, in addition to calculating a percentage match of a comparison between the current identification data and the authenticated identification data, the computing system 120 may also calculate a confidence metric or confidence level. The confidence metric represents a confidence level that a percentage match between the current identification data and the authenticated identification data exceeds the dynamic threshold. A required confidence level of the percentage match varies based on the level of restriction of the age-restricted item. If the computing system 120 determines that the comparison exceeds the threshold based on a percentage match, but the confidence level is low, then the computing system 120 may reject the current identification data, and request another biometric data from the user. If the computing system 120 determines that the comparison exceeds the threshold based on a percentage match, and the confidence level is high, then the computing system 120 may validate the current identification data, and allow the user to continue with the purchase of the age-restricted item. The impact of the confidence level may also vary by the type or level of restriction of age-restricted item. For example, if the confidence level in the percentage match is low, but the level of restriction is also low, then the computing system 120 may still approve the validation. If the confidence level in the percentage match is low, and the level of restriction is high, the computing system 120 may reject the validation.

Accordingly, the alternative embodiment of the identification validation system 100 may be implemented to validate an age and/or identity of a user at a mobile point of sale, without requiring intervention by a store representative. Further, using the system 100, age or identification may be validated even if the user does not have identifying items with them at the point of sale (e.g. left ID in the car).

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the identification validation system 100 may improve identity theft security technology as well as improve mobile payment application technology, utilizing hardware to intelligently validate age/identity at the point of sale. Embodiments of the identification validation system 100 may further determine which biometric input functionality to utilize based on a type of age-restricted item and/or a user preference. Thus, the age validation may be individualized to each user/user device, which is being used to capture the current age related biometric data.

Referring now to FIG. 8, which depicts a flow chart of a method 300 for validating age identification at a point of sale, in accordance with embodiments of the present invention. One embodiment of a method 300 or algorithm that may be implemented for validating age identification at a point of sale with the identification validation system 100 described in FIGS. 1-6C using one or more computer systems as defined generically in FIG. 11 below, and more specifically by the specific embodiments of FIG. 1.

Embodiments of the method 300 for validating age identification at a point of sale, in accordance with embodiments of the present invention, may begin at step 301 wherein a first age-restricted item is selected for purchase at a first point of sale. Step 302 determines that an age validation feature of a mobile wallet application is not enabled. Step 303 requires the user to submit an identification card at the first point of sale. Step 304 generates a code for the purchase of the age-restricted item after validating the identification card of the user. Step 305 prompts the user to enable the age validation feature by submitting a biometric using the user mobile device. Step 306 stores the biometric data on the blockchain. Step 307 enables the age validation feature. Step

308 detects that a second age-restricted item is selected for purchase at a second point of sale. Step 309 determines that the age validation feature is enabled on the mobile wallet application. Step 310 identifies current biometric features of the user with one or more cameras at the second point of sale. Step 311 access the blockchain to compare the current biometric features with the stored biometric features on the blockchain. Step 312 generates a code for the purchase of the second age-restricted item when the comparison exceeds a threshold.

Figure 9:
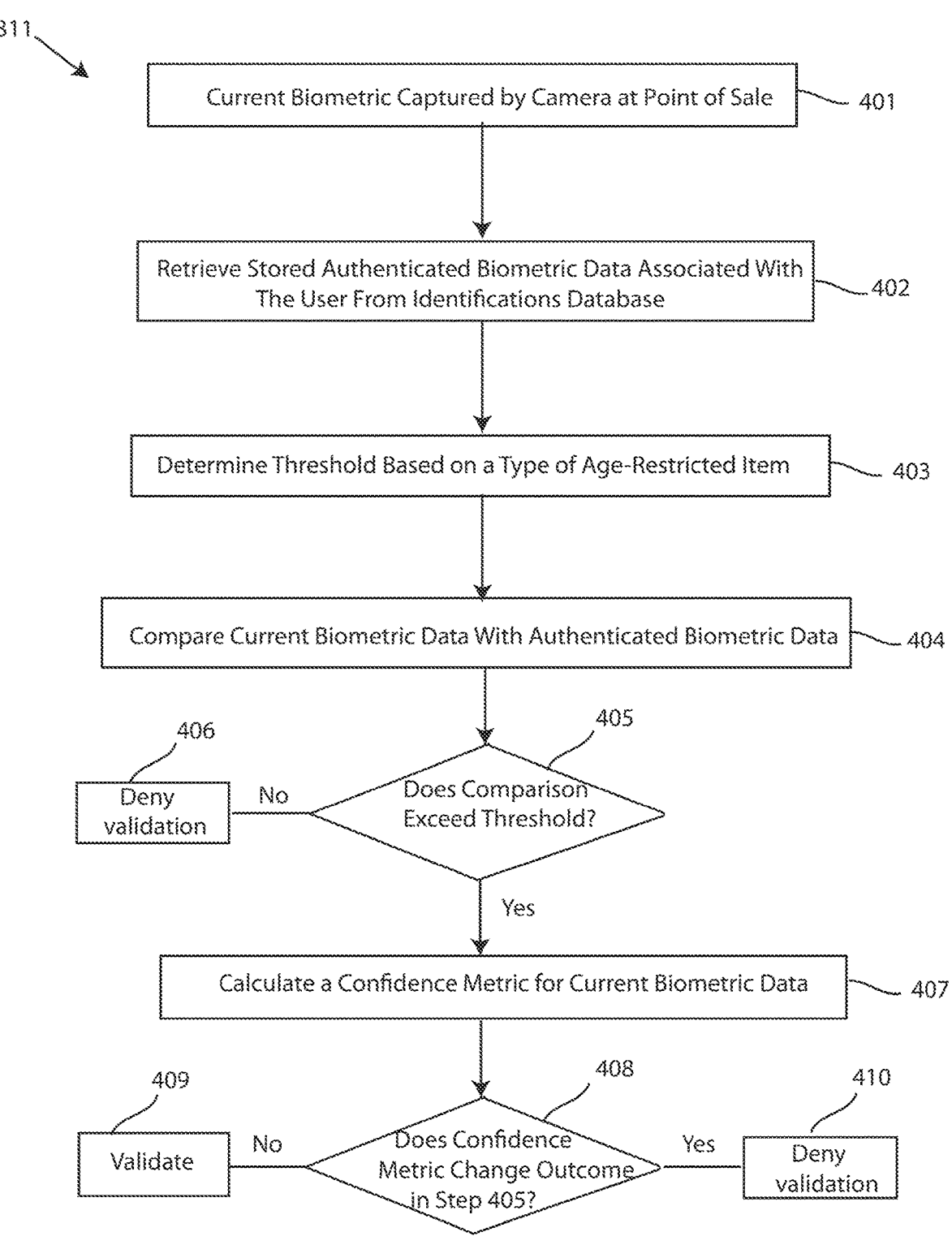
FIG. 9 depicts a detailed chart of a step of the method of FIG. 8, in accordance with an embodiment of the present invention.

FIG. 9 depicts a detailed chart of step 311 of the method of FIG. 8, in accordance with an embodiment of the present invention. At step 401, the current biometric is captured by the camera at the point of sale. Step 402 retrieves a stored authenticated biometric data associated with the user from identification database(s) 111. Step 403 determines a threshold based on a type of age-restricted item, and potentially a type of or a required number of biometric functionalities to be used for data capture. Step 404 compares the current biometric data with the authenticated biometric data. Step 405 determines whether the comparison exceeds the threshold. If no, then step 406 denies the validation. If yes, then step 407 calculates a confidence metric for the current biometric data. Step 408 determines whether the confidence metric/level changes the outcome determined in step 405 (e.g. that the comparison exceeded the threshold). If yes, then step 409 validates. If no, then step 410 denies the validation.

Figure 10:
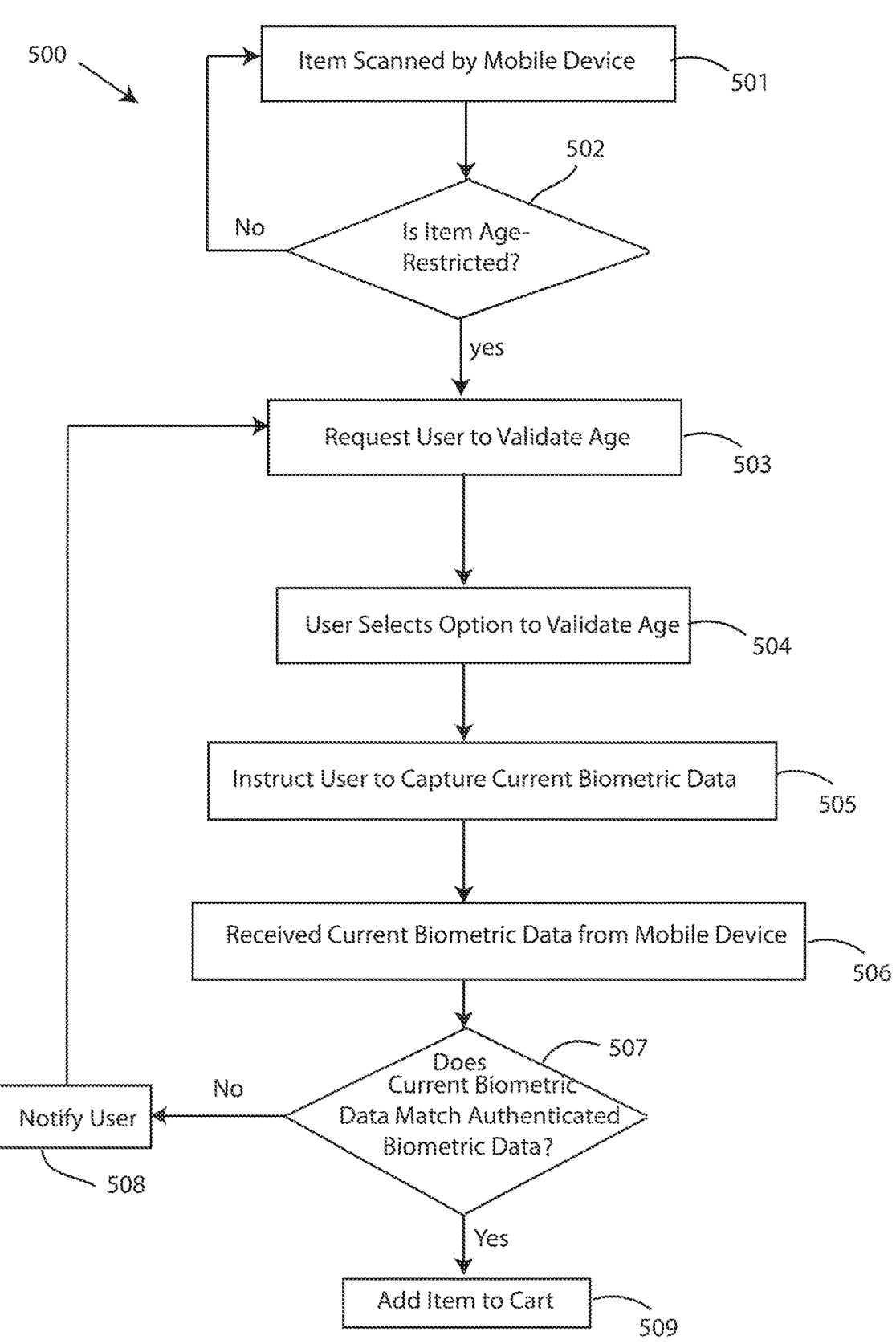
FIG. 10 depicts a detailed flow chart of a method of validating age identification at a point of sale, in accordance with the alternative embodiment of the present invention.

FIG. 10 depicts a detailed flow chart of a method 500 of validating age identification at a point of sale, in accordance with an alternative embodiment of the present invention. At step 501, an item is scanned by the mobile device 110 of the user. Step 502 determines whether the item is an age-restricted item. If no, the method 500 returns to step 501. If yes, then step 503 requests the user to validate the user's age. At step 504, the user selects the option to validate the user's age, which is an optional step because the method 500 may automatically move to step 505 from step 502 (if yes). Step 505 instructs the mobile device 110 to capture biometric data of the user. At step 506, the biometric data is received from the mobile device 110. Step 507 determines whether the received biometric data matches an authenticated biometric data of the user. If no, then step 508 notifies the user of the rejection, and continues back to step 503. If yes, then step 509 adds the item to the mobile cart, and continues back to step 501.

Figure 11:
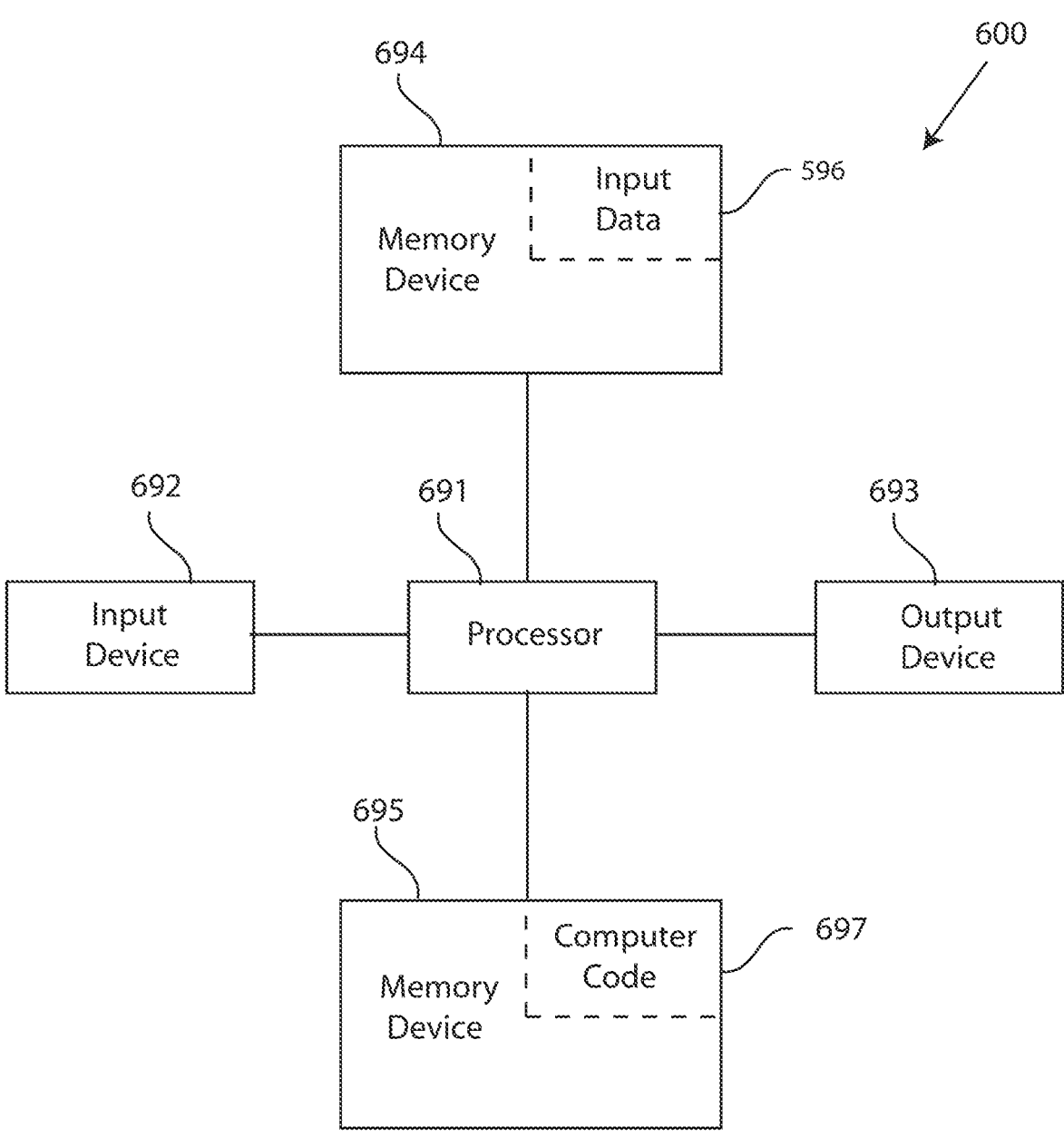
FIG. 11 depicts a block diagram of a computer system for the identification validation system of FIGS. 1-7C, capable of implementing methods for identification validation of FIGS. 8-10, in accordance with embodiments of the present invention.

FIG. 11 depicts a block diagram of a computer system for the identification validation system of FIGS. 1-7C, capable of implementing methods for identification validation of FIGS. 8-10, in accordance with embodiments of the present invention. The computer system 600 may generally comprise a processor 691, an input device 692 coupled to the processor 691, an output device 693 coupled to the processor 691, and memory devices 694 and 695 each coupled to the processor 691. The input device 692, output device 693 and memory devices 694, 695 may each be coupled to the processor 691 via a bus. Processor 691 may perform computations and control the functions of computer 600, including executing instructions included in the computer code 697 for the tools and programs capable of implementing a method for validating age identification at a point of sale in the manner prescribed by the embodiments of FIGS. 8-10 using the identification validation system 100 of FIGS. 1-7C, wherein the instructions of the computer code 697 may be executed by processor 691 via memory device 695. The computer code 697 may include software or program instructions that may implement one or more algorithms for implementing the methods for validating age identification at a point of sale, as described in detail above. The processor 691 executes the computer code 697. Processor 691 may include a single processing unit, or may be distributed across one or more processing units in one or more locations (e.g., on a client and server).

The memory device 694 may include input data 696. The input data 696 includes any inputs required by the computer code 697. The output device 693 displays output from the computer code 697. Either or both memory devices 694 and 695 may be used as a computer usable storage medium (or program storage device) having a computer-readable program embodied therein and/or having other data stored therein, wherein the computer-readable program comprises the computer code 697. Generally, a computer program product (or, alternatively, an article of manufacture) of the computer system 600 may comprise said computer usable storage medium (or said program storage device).

Memory devices 694, 695 include any known computer-readable storage medium, including those described in detail below. In one embodiment, cache memory elements of memory devices 694, 695 may provide temporary storage of at least some program code (e.g., computer code 697) in order to reduce the number of times code must be retrieved from bulk storage while instructions of the computer code 597 are executed. Moreover, similar to processor 691, memory devices 694, 695 may reside at a single physical location, including one or more types of data storage, or be distributed across a plurality of physical systems in various forms. Further, memory devices 694, 695 can include data distributed across, for example, a local area network (LAN) or a wide area network (WAN). Further, memory devices 694, 695 may include an operating system (not shown) and may include other systems not shown in FIG. 11.

In some embodiments, the computer system 600 may further be coupled to an Input/output (I/O) interface and a computer data storage unit. An I/O interface may include any system for exchanging information to or from an input device 692 or output device 693. The input device 692 may be, inter alia, a keyboard, a mouse, etc. or in some embodiments the touchscreen of a computing device. The output device 693 may be, inter alia, a printer, a plotter, a display device (such as a computer screen), a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 600, and may include any type of transmission link, including electrical, optical, wireless, etc.

An I/O interface may allow computer system 600 to store information (e.g., data or program instructions such as program code 697) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 697) in a computer system (e.g., computer 600) including one or more processor(s) 691, wherein the processor(s) carry out instructions contained in the computer code 697 causing the computer system to validate an age of a user at a point of sale. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for validating age identification at a point of sale. Thus, the present invention discloses a process for supporting, deploying and/or integrating computer infrastructure, integrating, hosting, maintaining, and deploying computer-readable code into the computer system 600, wherein the code in combination with the computer system 600 is capable of performing a method for validating age identification at a point of sale.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for validating age identification during a purchase of an age-restricted item by a customer, the method comprising:

receiving, at point of sale device, an indication that a customer has selected the age-restricted item for purchase;

verifying, by a processor, an identity of the customer based on facial features of the customer captured by a camera;

transmitting, by the processor, a validation signal to the point of sale device to cause the point of sale device to generate, on a display of the point of sale device, a scannable age validation code indicative of a successful verification of the identity of the customer and configured to be scanned by the mobile device of the customer to complete the purchase of the age-restricted item; and permitting the customer to scan the scannable age validation code on the display of the point of sale device with the mobile device of the customer to complete the purchase of the age-restricted item.

2. The method of claim 1, further comprising calculating, by the processor, a confidence metric of comparison between the facial features of the customer captured by the camera and at least one biometric stored in a database.

3. The method of claim 2, wherein the confidence metric represents a confidence level that a percentage match between the facial features of the customer captured by the camera and the at least one biometric stored in the database exceeds a dynamic threshold for verifying the identity of the customer, wherein a required confidence level of the percentage match varies based on a level of restriction of the age-restricted item.

4. The method of claim 3, wherein the level of restriction of the age-restricted item depends on an age limit of the age-restricted item, an impact on a health of the customer, and a severity of a punishment for breaking a law governing a sale of the age-restricted item to an underage customer.

5. The method of claim 1, further comprising verifying, by the processor, the identity of the customer based on data captured by at least one of a fingerprint sensor, a retinal scanner, and a microphone, wherein the fingerprint sensor, the retinal scanner, and the microphone are incorporated into a software application executable on the mobile device of the customer.

6. The method of claim 5, wherein the required current identification method requires a combination of at least two different biometric data input functionalities.

7. The method of claim 1, further comprising running a mobile wallet application on the mobile device of the customer, wherein an age validation feature associated with an account of the customer is enabled within the mobile wallet application.

8. The method of claim 7, further comprising analyzing, by the processor, a purchase history of age-restricted items purchased with the mobile wallet application having the age validation feature enabled with a recent purchase activity to determine that fraud has occurred.

9. The method of claim 8, further comprising, in response to determining that fraud has occurred, disabling the age validation feature within the mobile wallet application.

10. The method of claim 7, further comprising detecting that the account of the customer is logged in at two points of sale within a predetermined time and at different geographical locations, and in response to the detecting, disabling the age validation feature.

11. A computer system in communication with a point of sale device for validating age identification during a purchase of an age-restricted item by a customer, comprising:

a processor;

a memory device coupled to the processor; and a computer readable storage device coupled to the processor, wherein the storage device contains program code executable by the processor via the memory device to implement a method for validating age identification at a point of sale device, the method comprising:

receiving, at point of sale device, an indication that a customer has selected the age-restricted item for purchase;

verifying, by a processor, an identity of the customer based on facial features of the customer captured by a camera;

transmitting, by the processor, a validation signal to the point of sale device to cause the point of sale device to generate, on a display of the point of sale device, a scannable age validation code indicative of a successful verification of the identity of the customer and configured to be scanned by the mobile device of the customer to complete the purchase of the age-restricted item; and permitting the customer to scan the scannable age validation code on the display of the point of sale device with the mobile device of the customer to complete the purchase of the age-restricted item.

12. The computer system of claim 11, further comprising calculating, by the processor, a confidence metric of comparison between the facial features of the customer captured by the camera and at least one biometric stored in a database.

13. The computer system of claim 12, wherein the confidence metric represents a confidence level that a percentage match between the facial features of the customer captured by the camera and the at least one biometric stored in the database exceeds a dynamic threshold for verifying the identity of the customer, wherein a required confidence level of the percentage match varies based on a level of restriction of the age-restricted item.

14. The computer system of claim 11, wherein the processor is configured to verify the identity of the customer based on data captured by at least one of a fingerprint sensor, a retinal scanner, and a microphone, wherein the fingerprint sensor, the retinal scanner, and the microphone are incorporated into a software application executable on the mobile device of the customer.

15. The computer system of claim 11, further including a mobile wallet application executable on the mobile device of the customer, wherein an age validation feature associated with an account of the customer is enabled within the mobile wallet application.

16. The computer system of claim 15, wherein the processor is programmed to analyze a purchase history of age-restricted items purchased with the mobile wallet application having the age validation feature enabled with a recent purchase activity to determine that fraud has occurred and, in response to a determination that fraud has occurred, disable the age validation feature within the mobile wallet application.

17. A computer program product, comprising a computer readable hardware storage device storing a computer readable program code, the computer readable program code comprising an algorithm that when executed by a computer processor of a computing system implements a method for validating age identification at a point of sale device, the method comprising:

receiving, at point of sale device, an indication that a customer has selected the age-restricted item for purchase;

verifying, by a processor, an identity of the customer based on facial features of the customer captured by a camera;

transmitting, by the processor, a validation signal to the point of sale device to cause the point of sale device to generate, on a display of the point of sale device, a scannable age validation code indicative of a successful verification of the identity of the customer and configured to be scanned by the mobile device of the customer to complete the purchase of the age-restricted item; and permitting the customer to scan the scannable age validation code on the display of the point of sale device with the mobile device of the customer to complete the purchase of the age-restricted item.

18. The computer program product of claim 17, further comprising calculating, by the processor, a confidence metric of comparison between the facial features of the customer captured by the camera and at least one biometric stored in a database, wherein the confidence metric represents a confidence level that a percentage match between the facial features of the customer captured by the camera and the at least one biometric stored in the database exceeds a dynamic threshold for verifying the identity of the customer, wherein a required confidence level of the percentage match varies based on a level of restriction of the age-restricted item.

19. The computer program product of claim 17, further comprising verifying, by the processor, the identity of the customer based on data captured by at least one of a fingerprint sensor, a retinal scanner, and a microphone, wherein the fingerprint sensor, the retinal scanner, and the microphone are incorporated into a software application executable on the mobile device of the customer.

20. The computer program product of claim 17, further comprising:

running a mobile wallet application on the mobile device of the customer, wherein an age validation feature associated with an account of the customer is enabled within the mobile wallet application; and analyzing, by the processor, a purchase history of age-restricted items purchased with the mobile wallet application having the age validation feature enabled with a recent purchase activity to determine that fraud has occurred; and in response to determining that fraud has occurred, disabling the age validation feature.

\* \* \* \* \*